US008849344B2

(12) United States Patent
Hirano

(10) Patent No.: US 8,849,344 B2
(45) Date of Patent: *Sep. 30, 2014

(54) RADIO COMMUNICATION SYSTEM, ITS METHOD, DEVICE AND PROGRAM USED FOR THEM

(75) Inventor: Yumi Hirano, Tokyo (JP)

(73) Assignee: Nec Corporation, Tokyo (JP)

( * ) Notice: Subject to any disclaimer, the term of this patent is extended or adjusted under 35 U.S.C. 154(b) by 607 days.

This patent is subject to a terminal disclaimer.

(21) Appl. No.: 12/523,568

(22) PCT Filed: Jan. 15, 2008

(86) PCT No.: PCT/JP2008/050337

§ 371 (c)(1),
(2), (4) Date: Jul. 17, 2009

(87) PCT Pub. No.: WO2008/087931

PCT Pub. Date: Jul. 24, 2008

(65) Prior Publication Data

US 2010/0041434 A1 Feb. 18, 2010

(30) Foreign Application Priority Data

Jan. 17, 2007 (JP) .................. 2007-008076

(51) Int. Cl.
*H04M 1/00* (2006.01)
*H04W 36/00* (2009.01)
*H04W 4/00* (2009.01)
*H04W 4/02* (2009.01)
*H04W 36/30* (2009.01)

(52) U.S. Cl.
CPC ............ *H04W 36/0083* (2013.01); *H04W 4/02* (2013.01); *H04W 36/30* (2013.01)
USPC ................................... 455/552.1; 455/435.2

(58) Field of Classification Search
CPC ...... H04W 88/06; H04W 36/14; H04L 47/10; H04L 47/14; H04L 47/24

See application file for complete search history.

(56) References Cited

U.S. PATENT DOCUMENTS

| | | | |
|---|---|---|---|
| 2003/0022628 A1* | 1/2003 | Mamiya et al. | 455/67.1 |
| 2004/0203717 A1* | 10/2004 | Wingrowicz et al. | 455/423 |
| 2005/0185651 A1* | 8/2005 | Rinne | 370/395.1 |
| 2005/0185653 A1 | 8/2005 | Ono et al. | |
| 2005/0272428 A1* | 12/2005 | Tanabe et al. | 455/439 |

(Continued)

FOREIGN PATENT DOCUMENTS

| | | | |
|---|---|---|---|
| JP | 2000092541 A | 3/2000 |
| JP | 2004032337 A | 1/2004 |

(Continued)

OTHER PUBLICATIONS

International Search Report for PCT/JP2008/050337 mailed May 1, 2008.

(Continued)

*Primary Examiner* — Yuwen Pan
*Assistant Examiner* — Ayodeji Ayotunde
(74) *Attorney, Agent, or Firm* — Sughrue Mion, PLLC

(57) ABSTRACT

In a communication system which can be connected to two different radio communication networks, wireless link quality information on a base station around both of terminals performing communication by using one radio communication network and according to the wireless link quality information, it is judged whether a radio terminal is to be connected to the radio communication network.

24 Claims, 13 Drawing Sheets

(56) References Cited

U.S. PATENT DOCUMENTS

| | | | |
|---|---|---|---|
| 2006/0183476 A1* | 8/2006 | Morita et al. | 455/435.2 |
| 2008/0146160 A1* | 6/2008 | Jiang et al. | 455/67.11 |
| 2010/0014495 A1* | 1/2010 | Hirano | 370/338 |

FOREIGN PATENT DOCUMENTS

| | | | |
|---|---|---|---|
| JP | 2005086471 A | 3/2005 |
| JP | 2005136553 A | 5/2005 |
| JP | 2005244525 A | 9/2005 |
| JP | 2006020270 A | 1/2006 |
| JP | 2006140705 A | 6/2006 |
| JP | 2006279577 A | 10/2006 |

OTHER PUBLICATIONS

Japanese Office Action for JP2008-554029 mailed on Apr. 25, 2012.

* cited by examiner

RADIO COMMUNICATION SYSTEM, ITS METHOD, DEVICE AND PROGRAM USED FOR THEM

This application is the National Phase of PCT/JP2008/050337, filed Jan. 15, 2008, which is based upon and claims priority to Japanese Patent Application No. 2007-008076, filed on Jan. 17, 2007, which is incorporated herein by reference in its entirety.

APPLICABLE FIELD IN THE INDUSTRY

The present invention relates to a wireless communication system and its method as well as a device and a program each of which is used therefor, and more particularly to a wireless communication system and its method that enable a terminal device connectable to a plurality of wireless communication networks to efficiently select the communication network as well as a device and a program each of which is used therefor.

BACKGROUND ART

In Patent document 1, the dual mode communication method has been disclosed in which a terminal selectively connectable to multiple communication systems switches the communication system to which the terminal should set up a connection. In the technology disclosed in the Patent document 1, when the terminal that is communicating via a W-CDMA system has detected that the residual battery has decreased to less than a predetermined threshold, the terminal determines whether or not it possible to communicate by using a GSM system which can operate with power consumption less than that of the W-CDMA system, and a connection of the terminal and the W-CDMA system is switched into a connection of the terminal and the GSM system without the communication via the W-CDMA system disconnected if it is determined possible to communicate with the GSM system.

Besides, in recent years, a combined wireless terminal device connectable to a network as well such as a wireless LAN network that is narrow in a cell range but is capable of making high-rate communication, in addition to a wireless communication network such as a 3G network that is slow in communication but is wide in a cell range, and connectable in any place, has made its appearance.

One example of the wireless base station device and the wireless terminal device of this type, which have been conventionally developed, is described in Patent document 2. These devices are employed for a purpose of easily realizing an inter-system handover scheme without increasing a load imposed upon the wireless terminal device. This technology is configured of a combined wireless terminal device and base station devices for a plurality of networks. The system having this configuration operates as follows. The base station device of a 3G wireless communication network acquires periodically position registration information of the base station device of the wireless LAN network. Further, the terminal device acquires position information of the wireless LAN base station device from the 3G communication network base station device, and acquires a bandwidth occupation situation of a wireless channel within a cell of the above wireless LAN base station with a scan by the wireless LAN communication.

Patent document 1: JP-P2006-279577A
Patent document 2: JP-P2005-086471A

DISCLOSURE OF THE INVENTION

Problems to be Solved by the Invention

By the way, in a status where a connection to both of the wireless LAN network and the 3G network can be set up, when a connection to the wireless LAN network is set up in the case of the communication in which data does not need to be transmitted at a high rate, for example, in the case that a data quantity that should be transmitted at a time is few and data does not need to be transmitted at a high rate because the packet size is small, in the case that employment of another network alleviates the burden in terms of the cost, or the like, high speediness, inexpensiveness, etc. which are special features of the wireless LAN, cannot be put to practical use, and the wastefulness is generated from a viewpoint of saving the power. Thus, at the moment of commencing communication, a determination as to whether to set up a connection to the wireless LAN network or to set up a connection to the 3G network has to be synthetically made from a viewpoint of the bandwidth occupation situation within the wireless LAN base station cell, the required quality, the saving of the power, etc.

In addition hereto, in the case that, even though there is a vacancy in the band of the wireless LAN base station to which its own terminal is to revert, the wireless LAN base station to which the wireless terminal of a communication partner has reverted cannot assign a band equivalent to the band that is assigned to its own terminal, it follows that the useless band is assigned to its own terminal and resultantly, the power is wastefully consumed.

Thereupon, the present invention has been accomplished in consideration of the above-mentioned problems, and an object thereof lies in a point that providing the system and the device for selecting a communication network by taking the communication quality situation such as a band situation of the wireless LAN base station in the vicinity of the communication partner wireless terminal into consideration, and selecting an appropriate wireless LAN network so that a connection to the wireless LAN network is set up only when an advantage of the wireless LAN can be put to practical use causes a wireless LAN transceiver to operate only when necessary, thereby allowing the power consumption during communication to be reduced, and the network resource such as the limited band of the wireless LAN to be effectively utilized.

Means to Solve the Problems

The present invention for solving the above-mentioned problems, which is a wireless communication system in which a wireless terminal is connectable to two wireless communication networks or more, said wireless communication system comprising: an acquiring means for acquiring wireless link quality information associated with a wireless link quality of a base station in a predetermined wireless communication network to which a wireless terminal and a wireless terminal of a communication partner of said wireless terminal can set up a connection; and a determining means for determining whether said wireless terminal sets up a connection to said predetermined wireless communication network based upon said wireless link quality information.

The present invention for solving the above-mentioned problems, which is a wireless communication system comprising: a server comprising: a quality information acquiring means for acquiring communication quality information associated with a wireless link quality of a base station in a predetermined wireless communication network; and a means for transmitting the wireless link quality information of the base station to which a wireless terminal and a wireless terminal of a communication partner of said wireless terminal are connectable, out of the base stations in said predetermined wireless communication network, to said wireless terminal; and a wireless terminal comprising a determining means for receiving the wireless link quality information of the base station in said predetermined wireless communication network, and determining whether to set up a connection to said predetermined wireless communication network based upon said wireless link quality information.

The present invention for solving the above-mentioned problems, which is a wireless communication system comprising: a server comprising: a quality information acquiring means for acquiring wireless link quality information associated with a wireless link quality of a base station in a predetermined wireless communication network; a determining means for, based upon the wireless link quality information of the base station to which a wireless terminal is connectable, out of the base stations in said predetermined wireless communication network, determining whether said wireless terminal and the wireless terminal of a communication partner of said wireless terminal set up a connection to said predetermined wireless communication network; and a means for transmitting a determination result by said determining means to said wireless terminal; and a wireless terminal comprising a means for receiving said determination result of the connection, and setting up a connection to said predetermined wireless communication network based upon said determination result of the connection.

The present invention for solving the above-mentioned problems, which is a server for managing a wireless terminal that can set up a connection to two wireless communication networks or more, said server comprising: an acquiring means for acquiring wireless link quality information associated with a wireless link quality of a base station in a predetermined wireless communication network; and a means for transmitting the wireless link quality information of the base station to which said wireless terminal and the wireless terminal of a communication partner of said wireless terminal are connectable, out of the base stations in said predetermined wireless communication network, to said wireless terminal.

The present invention for solving the above-mentioned problems, which is a server for managing a wireless terminal that can set up a connect to two wireless communication networks or more, said server comprising: an acquiring means for acquiring wireless link quality information associated with a wireless link quality of a base station in a predetermined wireless communication network; a determining means for determining whether said wireless terminal sets up a connection to said predetermined wireless communication network based upon the wireless link quality information of the base station to which said wireless terminal and the wireless terminal of a communication partner of said wireless terminal are connectable, out of the base stations in said predetermined wireless communication network; and a means for transmitting a determination result by said determining means to said wireless terminal.

The present invention for solving the above-mentioned problems, which is a wireless terminal that can set up a connection to two wireless communication networks or more, said wireless terminal comprising: a means for receiving wireless link quality information of a base station of a wireless communication network to which said wireless terminal and the wireless terminal of a communication partner of said wireless terminal can revert; and a determining means for determining whether to set up a connection to said predetermined wireless communication network based upon said wireless link quality information.

The present invention for solving the above-mentioned problems, which is a wireless terminal that can set up a connection to two wireless communication networks or more, said wireless terminal comprising: a means for receiving a determination as to whether or not a connection to a base station of a predetermined wireless communication network is possible from a server; and a means for setting up a connection to said predetermined wireless communication network based upon said determination as to whether or not a connection is possible.

The present invention for solving the above-mentioned problems, which is a wireless communication method in which a connection to two wireless communication networks or more is possible, said wireless communication method comprising: acquiring wireless link quality information associated with a wireless link quality of a base station in a predetermined wireless communication network to which a wireless terminal and a wireless terminal of a communication partner of said wireless terminal can set up a connection; and determining whether said wireless terminal sets up a connection to said predetermined wireless communication network based upon said wireless link quality information.

The present invention for solving the above-mentioned problems, which is a program of a server for managing a wireless terminal that can set up a connection to two wireless communication networks or more, said program causing the server to execute the processes of: acquiring wireless link quality information associated with a wireless link quality of a base station in a predetermined wireless communication network; and transmitting the wireless link quality information of the base station to which said wireless terminal and the wireless terminal of a communication partner of said wireless terminal are connectable, out of the base stations in said predetermined wireless communication network, to said wireless terminal.

The present invention for solving the above-mentioned problems, which is a program of a server for managing a wireless terminal that can set up a connection to two wireless communication networks or more, said program causing the server to execute the processes of: acquiring wireless link quality information associated with a wireless link quality of a base station in a predetermined wireless communication network; determining whether said wireless terminal sets up a connection to said predetermined wireless communication network based upon the wireless link quality information of the base station to which said wireless terminal and the wireless terminal of a communication partner of said wireless terminal are connectable, out of the base stations in said predetermined wireless communication network; and transmitting said determination result to said wireless terminal.

The present invention for solving the above-mentioned problems, which is a program of a wireless terminal that can set up a connection to two wireless communication networks or more, said program causing the wireless terminal to execute the processes of: receiving wireless link quality information of a base station of a predetermined wireless communication network; and determining whether to set up a connection to said predetermined wireless communication network based upon said wireless link quality information.

The present invention for solving the above-mentioned problems, which is a program of a wireless terminal that can set up a connection to two wireless communication networks or more, said program causing the wireless terminal to execute the processes of: receiving a determination as to whether or not a connection to a base station of a predetermined wireless communication network is possible; and setting up a connection to said predetermined wireless communication network based upon said determination as to whether or not a connection is possible.

AN ADVANTAGEOUS EFFECT OF THE INVENTION

An effect of the present invention lies in a point that effectively suppressing communication using the communication technique of which the power consumption is large, for example, communication using the wireless LAN makes it possible to realize the saving of the power in a terminal device side.

The reason is that the wireless LAN communication can be suppressed to a minimum level because it is determined whether or not the wireless LAN communication is made by taking the bandwidth occupation situation etc. of the wireless LAN base station to which the communication partner reverts into consideration at the moment of commencing communication. In addition hereto, selecting the communication using the 3G network based upon a determination of the bandwidth occupation situation etc. without venturing to cause its own terminal to revert to the wireless LAN base station makes it possible to make the communication that is low in the power consumption and yet is stabilized.

A second effect of the present invention is that the wasteful bandwidth occupation can be prevented and the limited band of the wireless LAN can be effectively utilized because the communication can be commenced by taking the bandwidth occupation situation of the wireless LAN base station to which the wireless terminal of the communication partner can revert into consideration.

DESCRIPTION OF NUMERALS

Figure 1:
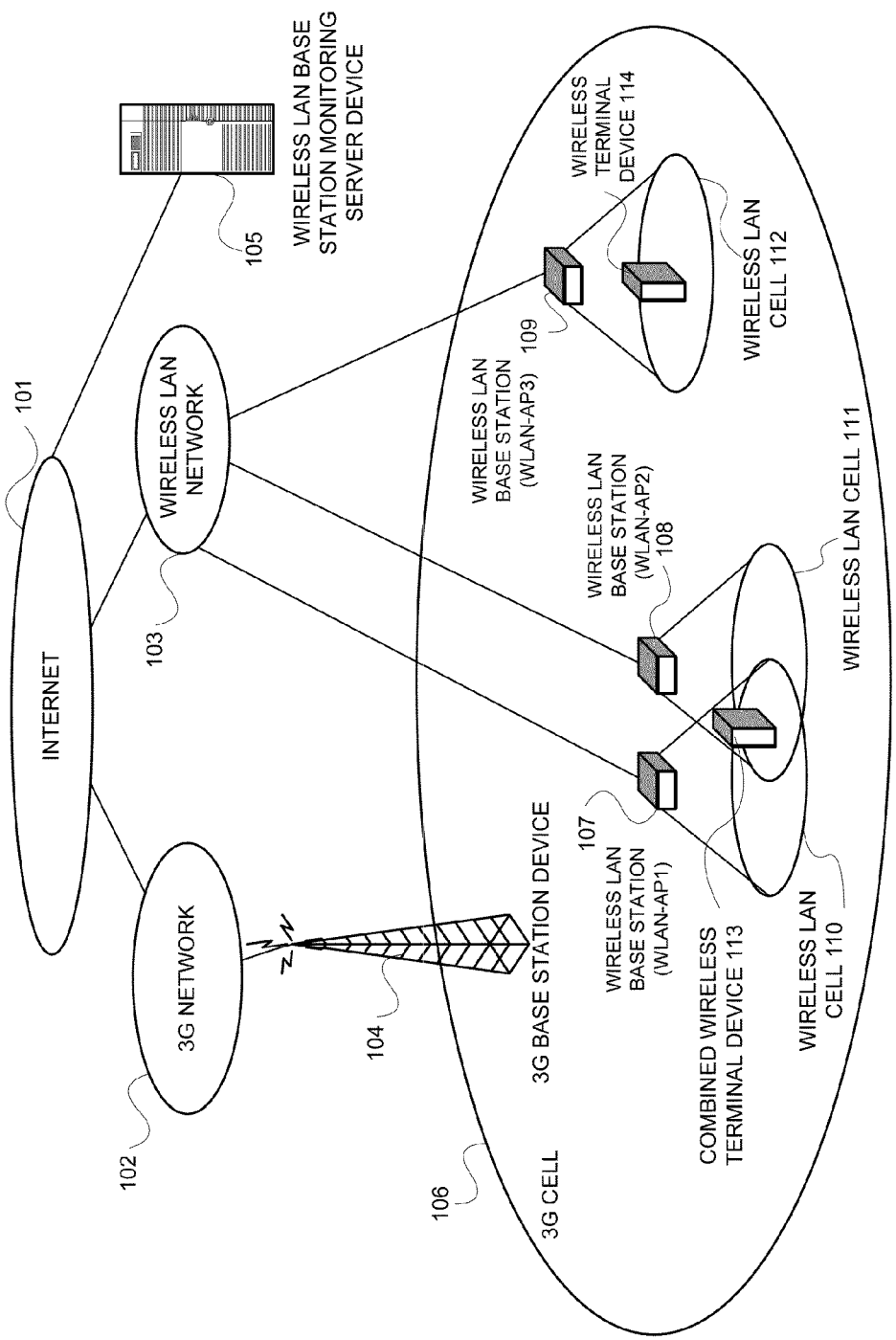
FIG. 1 is a view illustrating a wireless system configuration in a first embodiment of the present invention.

102 3G network
103 wireless LAN network
104 3G base station device
105 wireless LAN base station monitoring server device
106 3G cell
107, 108, and 109 wireless LAN base station devices
110, 111, and 112 wireless LAN cells
113 combined wireless terminal device
114 wireless terminal device

BEST MODE FOR CARRYING OUT THE INVENTION

Characteristics of the present invention will be explained.

The present invention is a wireless communication system in which a wireless terminal is connectable to two wireless communication networks or more, the wireless communication system comprising: an acquiring means for acquiring wireless link quality information associated with a wireless link quality of a base station in a predetermined wireless communication network to which a wireless terminal and a wireless terminal of a communication partner of the wireless terminal can set up a connection; and a determining means for determining whether the wireless terminal sets up a connection to the predetermined wireless communication network based upon the wireless link quality information.

Also, the acquiring means acquires the wireless link quality information associated with the wireless link quality of the base station in the predetermined wireless communication network through the wireless communication network except the predetermined wireless communication network.

Also, at least one of the predetermined communication networks is a narrow-range and high-rate communication network, and at least one is a wide-range and low-rate wireless communication network.

Also, for example, the narrow-range and high-rate wireless communication network is a wireless LAN network, and wherein the wide-range and low-rate wireless communication network is a 3G network.

Also, the acquiring means acquires position information associated with a position of the base station to which the wireless terminal and the communication partner wireless terminal are connectable, and control information necessary for setting up a connection to the base station device in addition to the wireless link quality information; and the determining means determines whether the wireless terminal sets up a connection to the predetermined wireless communication network based upon the acquired position information, control information, and wireless link quality information.

Also, the wireless link quality information is bandwidth occupation information of the base station.

Also, the wireless communication system comprises an application information acquiring means for acquiring application information that the wireless terminal employs for communication; and wherein the determining means determines whether the wireless terminal sets up a connection to the predetermined wireless communication network based upon at least each of the application information and the wireless link quality information.

The present invention is a wireless communication system comprising: a server comprising: a quality information acquiring means for acquiring wireless link quality information associated with a wireless link quality of a base station in a predetermined wireless communication network; and a means for transmitting the wireless link quality information of the base station to which a wireless terminal and a wireless terminal of a communication partner of the wireless terminal are connectable, out of the base stations in the predetermined wireless communication network, to the wireless terminal; and a wireless terminal comprising a determining means for receiving the wireless link quality information of the base station in the predetermined wireless communication network, and determining whether to set up a connection to the predetermined wireless communication network based upon the wireless link quality information.

The present invention is a wireless communication system comprising: a server comprising: a quality information acquiring means for acquiring wireless link quality information associated with a wireless link quality of a base station in a predetermined wireless communication network; a determining means for, based upon the wireless link quality information of the base station to which a wireless terminal is connectable, out of the base stations in the predetermined wireless communication network, determining whether the wireless terminal and the wireless terminal of a communication partner of the wireless terminal set up a connection to the predetermined wireless communication network; and a means for transmitting a determination result by the determining means to the wireless terminal; and a wireless terminal comprising a means for receiving the determination result of the connection, and setting up a connection to the predetermined wireless communication network based upon the determination result of the connection.

Also, the wireless terminal acquires the wireless link quality information or the determination result of the connection via the wireless communication network except the predetermined wireless communication network.

Also, the wireless terminal comprises a means for acquiring position information of its own terminal, and transmitting the position information to the server; and wherein the server comprises a means for selecting the wireless link quality information of the base station to which the wireless terminal is connectable based upon the position information of the wireless terminal.

Also, the server comprises a means for acquiring the position information of the wireless terminal, and selecting the wireless link quality information of the base station to which the wireless terminal is connectable based upon the position information of the wireless terminal.

The present invention is a server for managing a wireless terminal that can set up a connection to two wireless communication networks or more, the server comprising: an acquiring means for acquiring wireless link quality information associated with a wireless link quality of a base station in a predetermined wireless communication network; and a means for transmitting the wireless link quality information of the base station to which the wireless terminal and the wireless terminal of a communication partner of the wireless terminal are connectable, out of the base stations in the predetermined wireless communication network, to the wireless terminal.

The present invention is a server for managing a wireless terminal that can set up a connect to two wireless communication networks or more, the server comprising: an acquiring means for acquiring wireless link quality information associated with a wireless link quality of a base station in a predetermined wireless communication network; a determining means for determining whether the wireless terminal sets up a connection to the predetermined wireless communication network based upon the wireless link quality information of the base station to which the wireless terminal and the wireless terminal of a communication partner of the wireless terminal are connectable, out of the base stations in the predetermined wireless communication network; and a means for transmitting a determination result by the determining means to the wireless terminal.

Also, the server transmits the wireless link quality information or the determination result of the connection to the wireless terminal via the wireless communication network except the predetermined wireless communication network.

Also, the server comprises a means for identifying the communication partner wireless terminal from the information of the wireless terminal.

The present invention is a wireless terminal that can set up a connection to two wireless communication networks or more, the wireless terminal comprising: a means for receiving wireless link quality information of a base station of a wireless communication network to which the wireless terminal and the wireless terminal of a communication partner of the wireless terminal can revert; and a determining means for determining whether to set up a connection to the predetermined wireless communication network based upon the wireless link quality information.

Also, the wireless terminal receives the wireless link quality information via the wireless communication network except the predetermined wireless communication.

Also, the wireless terminal comprises a means for identifying the communication partner wireless terminal, and notifying its identification information to a server.

Also, the wireless terminal comprises: a position acquiring means for acquiring position information of the wireless terminal and the communication partner wireless terminal; and a means for transmitting the position information to the server.

Also, the wireless terminal comprises a means for, after setting up a connection to the base station of the predetermined wireless communication network, commencing communication with a packet size that conforms to a band of the communication partner wireless terminal.

Also, the present invention is a wireless terminal that can set up a connection to two wireless communication networks or more, the wireless terminal comprising: a means for receiving a determination as to whether or not a connection to a base station of a predetermined wireless communication network is possible from a server; and a means for setting up a connection to the predetermined wireless communication network based upon the determination as to whether or not a connection is possible.

Also, the wireless terminal receives the determination result of the connection via the wireless communication network except the predetermined wireless communication network.

Also, the wireless terminal comprises a means for identifying the wireless terminal of a communication partner of the wireless terminal, and notifying its identification information to the server.

Also, the wireless terminal comprises: a position acquiring means for acquiring position information of its own terminal; and a means for transmitting the position information to the server.

Also, the wireless terminal comprises a means for, after setting up a connection to the base station of the predetermined wireless communication network, commencing communication with a packet size that conforms to a band of the communication partner wireless terminal.

Also, the present invention is a wireless communication method in which a connection to two wireless communication networks or more is possible, the wireless communication method comprising: acquiring wireless link quality information associated with a wireless link quality of a base station in a predetermined wireless communication network to which a wireless terminal and a wireless terminal of a communication partner of the wireless terminal can set up a connection; and determining whether the wireless terminal sets up a connection to the predetermined wireless communication network based upon the wireless link quality information.

Also, the wireless communication method comprises acquiring the wireless link quality information associated with the wireless link quality of the base station in the predetermined wireless communication network via the wireless communication network except the predetermined wireless communication network.

The present invention is a program of a server for managing a wireless terminal that can set up a connection to two wireless communication networks or more, the program causes the server to execute the processes of: acquiring wireless link quality information associated with a wireless link quality of a base station in a predetermined wireless communication network; and transmitting the wireless link quality information of the base station to which the wireless terminal and the wireless terminal of a communication partner of the wireless terminal are connectable, out of the base stations in the predetermined wireless communication network, to the wireless terminal.

The present invention is a program of a server for managing a wireless terminal that can set up a connection to two wireless communication networks or more, the program causes the server to execute the processes of: acquiring wireless link quality information associated with a wireless link quality of a base station in a predetermined wireless communication network; determining whether the wireless terminal sets up a connection to the predetermined wireless communication network based upon the wireless link quality information of the base station to which the wireless terminal and the wireless terminal of a communication partner of the wireless terminal are connectable, out of the base stations in the predetermined wireless communication network; and transmitting the determination result to the wireless terminal.

Also, the acquiring process is a process of acquiring the wireless link quality information associated with the wireless link quality of the base station in the predetermined wireless communication network via the wireless communication network except the predetermined wireless communication network.

The present invention is a program of a wireless terminal that can set up a connection to two wireless communication networks or more, the program causes the wireless terminal to execute the processes of: receiving wireless link quality information of a base station of a predetermined wireless communication network; and determining whether to set up a connection to the predetermined wireless communication network based upon the wireless link quality information.

The present invention is a program of a wireless terminal that can set up a connection to two wireless communication networks or more, the program causes the wireless terminal to execute the processes of: receiving a determination as to whether or not a connection to a base station of a predetermined wireless communication network is possible; and setting up a connection to the predetermined wireless communication network based upon the determination as to whether or not a connection is possible.

Also, the receiving process is a process of acquiring the wireless link quality information or the determination as to whether or not a connection is possible via the wireless communication network except the predetermined wireless communication network.

Continuously, the detailed embodiment of the foregoing present invention will be explained.

A first embodiment of the present invention will be explained by making a reference to the accompanied drawings.

The present invention is characterized in, in a communication system in which a connection to two wireless communication networks or more each of which differs from the other is possible, acquiring wireless link quality information of the base station in the vicinity of both terminals that make communication with each other by employing the wireless communication network, and determining whether the wireless terminal should set up a connection to the wireless communication network based upon the above wireless link quality information. Additionally, while the present invention is applicable to the communication system in which a connection to two wireless communication networks or more each of which differs from the other is possible, the present invention is preferably applied to the communication system in which a wireless communication network (hereinafter, referred to as a wide-range and low-rate wireless communication network), which is wide in a range where a connection to the communication network is possible, but is slow in a transfer rate of data, and a wireless communication network (hereinafter, referred to as a narrow-range and high-rate wireless communication network), which is narrow in a range where a connection to the communication network is possible, but is fast in a transfer rate of data coexist. In the following explanation, as an example of the system having different wireless communication networks, the wireless LAN network, being representative of the narrow-range and high-rate wireless communication network, and the 3G network, being representative of the wide-range and low-rate wireless communication network are exemplified for explanation; however the wireless communication network is not limited hereto. For example, there exists Blue Tooth, or the like as a narrow-range and high-rate wireless communication network, and there exists WiMAX (Worldwide Interoperability for Microwave Access: IEEE 802.16a), PHS, IEEE 802.20, or the like as a wide-range and low-rate wireless communication network.

In addition hereto, the wireless link quality information of the base stations is desirably acquired via a wireless communication network different from the wireless communication network to which the wireless terminal is to set up a connection. For example, when the wireless terminal is to set up a connection to the wireless LAN network, the wireless link quality information of the base stations is desirably acquired via the 3G network.

FIG. 1 is a view illustrating one example of a configuration of the wireless communication control system in the embodiment of the present invention. Upon making a reference to FIG. 1, the wireless communication control system in the embodiment includes a combined wireless terminal device 113 that can make communication with both of a 3G network 102 and a wireless LAN network 103, a wireless terminal device 114 that can make communication at least with the wireless LAN network 103, wireless LAN base station devices 107, 108, and 109, a 3G base station device 104, and a wireless LAN base station monitoring server device 105.

The combined wireless terminal device 113 exists both within a 3G cell 106 range and within wireless LAN base station cells 110 and 111 ranges. The combined wireless terminal device 113 is connectable to the wireless LAN network 103 via the wireless LAN base station devices 107 and 108, and is connectable to the 3G network 102 via the 3G base station device 104.

The wireless terminal device 114 becomes a communication partner of the combined wireless terminal device 113. The wireless terminal device 114, which exists in a cell 112, is connectable to the wireless LAN network 103 via the wireless LAN base station 109, and may set up a connection to the 3G network or a wire network, being an access network other than it.

The wireless LAN base station monitoring server device 105 can make communication with each of the wireless LAN base station devices 107 to 109 within the 3G cell 106 range, and further, monitors the wireless LAN base station devices 107 to 109. In addition hereto, it can make communication with the combined wireless terminal device 113 through the 3G base station device 104 or the wireless LAN base station devices 107 and 108, and can make communication with wireless terminal device 114 through the wireless LAN base station device 109.

<Explanation of a Configuration of the Wireless LAN Base Station Devices 107 to 109>

Figure 2:
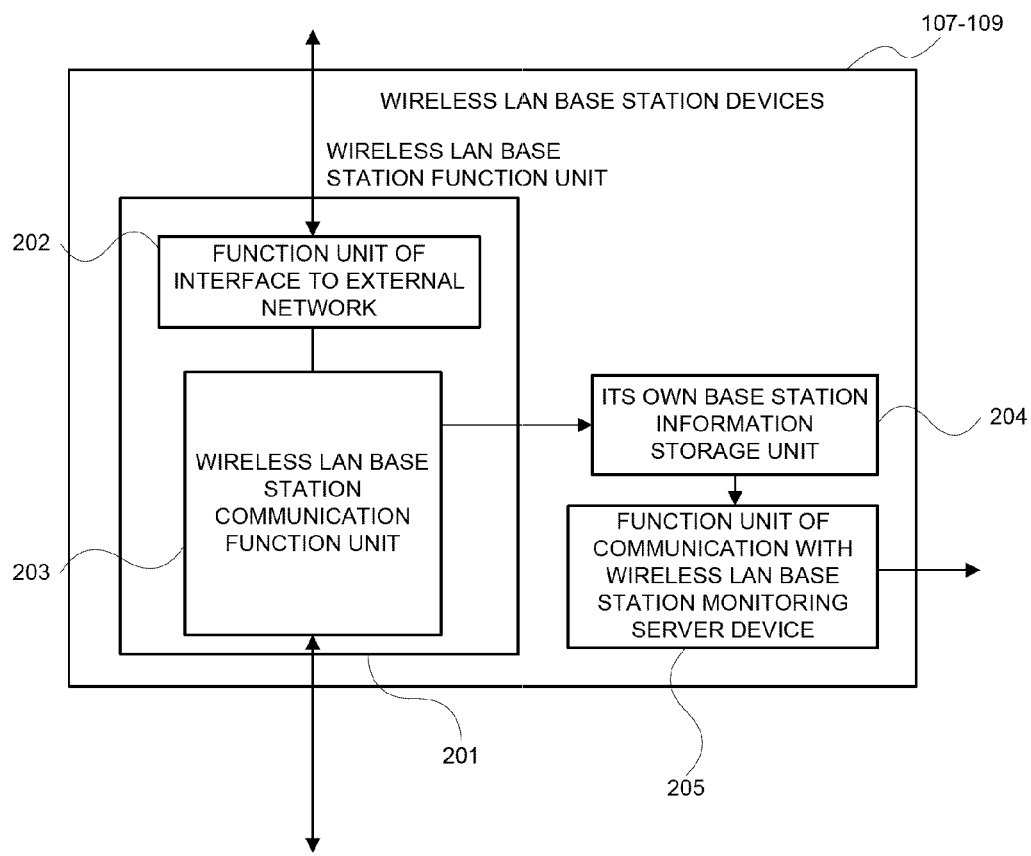
FIG. 2 is a view illustrating a configuration of a wireless LAN base station device in the first embodiment of the present invention.

FIG. 2 is a view illustrating a configuration of the wireless LAN base station devices 107 to 109 relating to the present invention.

The its own base station information storage unit 204 acquires a position of its own base station, a bandwidth occupation situation, wireless link quality information, base station information necessary for setting up a connection to its own station, etc. from a wireless LAN base station communication function unit 201, and stores them as its own base station information. Additionally, the position of its own base station does not need to be acquired when it has been already stored in the wireless LAN base station monitoring server device 105. And, the its own base station information is notified to the wireless LAN base station monitoring server device 105 via the function unit 205 of communication with the wireless LAN base station monitoring server device 105. Additionally, communication between each of the wireless LAN base station devices 107 to 109 and the wireless LAN base station monitoring server device 105 is made via an internet 101, and a 3G network, a wireless LAN network, a wire network, etc. are thinkable as an access network that is used at that moment.

<Explanation of the Wireless LAN Base Station Monitoring Server Device 105>

Figure 3:
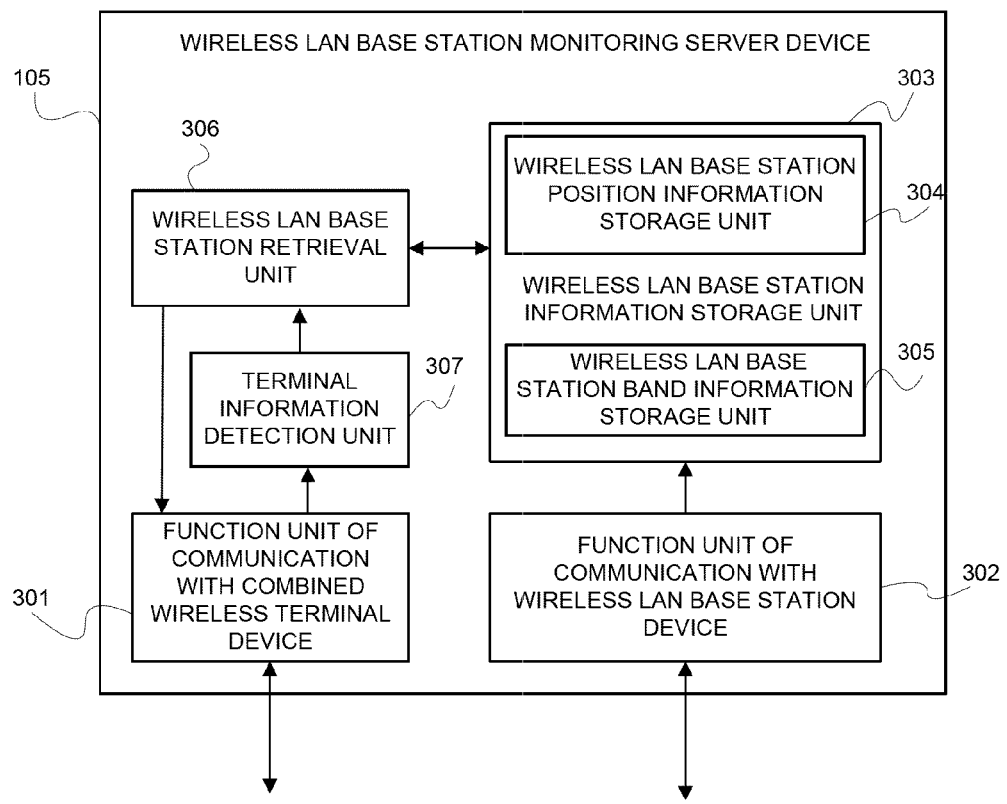
FIG. 3 is a view illustrating a configuration of a wireless LAN base station monitoring server device in the first embodiment of the present invention.

FIG. 3 is a view illustrating a configuration of the wireless LAN base station monitoring server device 105 relating to the present invention.

This wireless LAN base station monitoring server device 105 includes two function units as a communication function, i.e. a function unit 301 of communication with the combined wireless terminal and a function unit 302 of communication with the wireless LAN base station device, a wireless LAN base station retrieval unit 306, a terminal position information detection unit 307, and a wireless LAN base station information storage unit 303 that is comprised of a wireless LAN base station position information storage unit 304 and a wireless LAN base station band information storage unit 305.

The wireless LAN base station monitoring server device 105 acquires the wireless LAN base station information, for example, the position information of the wireless LAN base station, the wireless link quality information such as the bandwidth occupation situation, the base station information necessary for a connection, or the like from the wireless LAN base station devices 107 to 109, which are being monitored by the wireless LAN base station monitoring server device 105, by employing the function unit 302 of communication with the wireless LAN base station devices in FIG. 2, and stores it in the wireless LAN base station position information storage unit 304 and the wireless LAN base station band information storage unit 305 of the wireless LAN base station information storage unit 303. Additionally, the information being stored in the wireless LAN base station information storage unit is not limited to the position and the band information of the wireless LAN base station.

The terminal position information detection unit 307 detects the position information of the combined wireless terminal device 113, and the wireless terminal device 114 of a communication partner thereof, respectively, through the function unit 301 of communication with the combined wireless terminal from the combined wireless terminal device 113. As a method of detecting a position of the terminal, the method of acquiring GPS information, the method of specifying a position of the terminal based upon information of the cell in which the terminal is located, or the like is thinkable. The wireless LAN base station retrieval unit 306 acquires the position information of the combined wireless terminal device 113 from the terminal position information detection unit 307, compares the above information with the wireless LAN base station information acquired from the wireless LAN base station information storage unit 304, and retrieves the wireless LAN base station of the 3G cell 106 in the vicinity of the above combined wireless terminal device 114. And, the wireless LAN base station retrieval unit 306 notifies information as to whether or not the wireless LAN base station exists in the vicinity of the above combined wireless terminal device 113 and the wireless terminal, and if it exists, information of the above wireless LAN base station, for example, the position, the bandwidth occupation situation, the base station information necessary for a connection, or the like to the combined wireless terminal device 113 through the internet 101. At that moment, communication between each of the wireless LAN base station devices 107 to 109 and the wireless LAN base station monitoring server device 105 is made via the internet 101, and the 3G network 102, the wireless LAN network 103, the wire network means, etc. are thinkable as an access network that is used at that moment. When communication is made by using the 3G network 102, the function unit 301 of communication with the 3G network and the function unit 302 of communication with the wireless LAN base station device become identical to each other. Additionally, herein, the internet 101 does not always need to be the so-called "The Internet", and the networks of other types such as an exclusive network line being provided by a communication enterpriser do not cause any problem. Further, the wireless LAN base station monitoring server device 105 as well is not always arranged at a position in which a connection to the internet 101 is made, but the wireless LAN base station monitoring server device 105 can be arranged also at a position in which a connection to the 3G network 102 or the wireless LAN network 103 is made.

<Explanation of the Combined Wireless Terminal Device 113>

Figure 4:
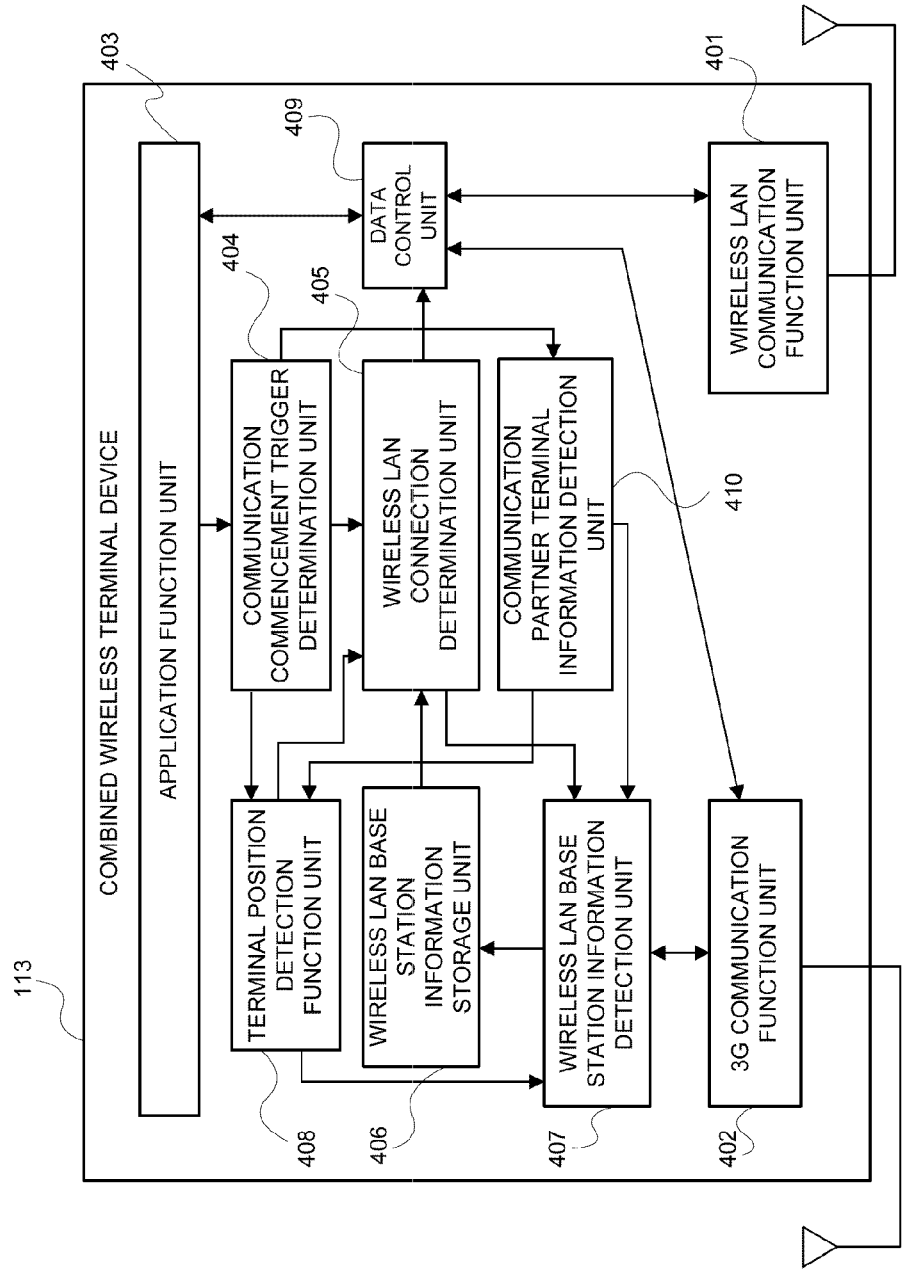
FIG. 4 is a view illustrating a configuration of a combined wireless terminal device in the first embodiment of the present invention.

FIG. 4 is a view illustrating a configuration of the combined wireless terminal device 113 relating to the present invention.

The combined wireless terminal device 113 includes a wireless LAN communication function unit 401 and a 3G communication function unit 402.

Further, the combined wireless terminal device 113 includes an application function unit 403. The so-called application function unit 403 in the present invention, which becomes an interface between a communication network and an end user or application software, is a function unit for inputting/outputting a reception/transmission packet, and signifies, for example, a web application and a voice application.

The combined wireless terminal device 113 includes a communication commencement trigger determination unit 404, a wireless LAN connection determination unit 405, a wireless LAN base station information storage unit 406, a wireless LAN base station information detection unit 407, and a terminal position detection function unit 408 as a function unit relating to selection of the communication network, and a data control unit 409 as a function unit for controlling data under communication. In addition hereto, the combined wireless terminal device 113 includes a communication partner terminal information detection unit 410 for identifying the communication partner wireless terminal, which is characteristic of the present invention.

The communication commencement trigger determination unit 404, upon receipt of information on a start etc. of the application relating to a communication commencement from the application function unit 403, determines the communication commencement. And, the communication commencement trigger determination unit 404 requests the terminal position detection function unit 408 to detect the position of its own terminal. In addition hereto, it requests communication partner terminal information detection unit 410 to identify the communication partner wireless terminal.

The wireless LAN connection determination unit 405, upon receipt of a communication commencement notification from the communication commencement trigger determination unit 404, requests the wireless LAN base station information detection unit 407 to acquire the wireless LAN base station information in order to determine the wireless LAN connection. The communication partner terminal information detection unit 410, upon receipt of a trigger for commencing communication from the communication commencement trigger determination unit 404, identifies the communication partner wireless terminal, and requests the terminal position detection function unit 408 to detect the communication partner wireless terminal. In addition hereto, the communication partner terminal information detection unit 410 requests the wireless LAN base station information detection unit 407 to acquire the information of the wireless LAN base station in the vicinity of the communication partner wireless terminal, for example, the position information of the wireless LAN base station, the bandwidth occupation situation, the base station information necessary for a connection, or the like.

The terminal position detection unit 408, upon receipt of a request for detecting the position of its own terminal from the communication commencement trigger determination unit 404, and a request for detecting the position of the communication partner from the communication partner wireless terminal information detection unit 410, detects respective positions. As a method of detecting a position of the terminal, the method of acquiring GPS information, the method of specifying a position of the terminal based upon information of the cell in which the terminal is located, or the like is thinkable.

The wireless LAN base station information detection unit 407 having received the request for acquiring the information of the wireless LAN base station in the vicinity of the its own terminal 113 and the communication partner wireless terminal 114 acquires the positions of both terminals detected by the terminal position detection unit 408, and notifies this position information to the wireless LAN base station monitoring server device 105 of FIG. 3 mentioned above. On the other hand, the wireless LAN base station information detection unit 407 acquires the information of the wireless LAN base station to which the its own terminal 113 and the communication partner wireless terminal 114 are connectable, for example, the position information of the wireless LAN base station, the bandwidth occupation situation, the base station information necessary for a connection, or the like from the wireless LAN base station monitoring server device 105, and stores it in the wireless LAN base station information storage unit 406. In the figure, the case of acquiring the position information of the wireless LAN base station, the bandwidth occupation situation, the base station information necessary for a connection, or the like through the 3G communication function unit 402 was mentioned; however it does not matter to acquire it through the wireless LAN communication function unit 401.

The wireless LAN connection determination unit 405 acquires the information of the wireless LAN base station to which the its own terminal 113 and the communication partner wireless terminal 114 are connectable, for example, the position information of the wireless LAN base station, the bandwidth occupation situation, the base station information necessary for a connection, or the like from the wireless LAN base station information storage unit 406 and the terminal position detection function unit 408, and determines whether or not to select the wireless LAN as a communication network. Additionally, the required wireless link quality at which a connection to the wireless LAN is permitted may be pre-stored in the wireless LAN connection determination unit 405 to determine the connection based upon this required wireless link quality, and further, the wireless link quality may be tinged with the application being used (a web application or a voice application) and other elements to actively prepare the required wireless link quality and to determine the connection based upon this required wireless link quality.

After the wireless LAN connection determination unit 405 decides the communication network, it notifies its determination result to the data control unit 409.

After the data control unit 409, which is located between the application function unit 403 and the selected communication function unit, out of the communication function units 401 and 402, acquires the selected connection network from the wireless LAN connection determination unit 405, it receives/delivers the packet between the application function unit 403 and the selected communication function unit, which is accompanied with transmission/reception during communication. Herein, a frame having information necessary for controlling communication as data may be transmitted/received through the 3G network 102 at any time irrespective of the situation of the wireless LAN communication in the combined wireless terminal device 113 because the above frame demands not the high-rate communication but the stabilized communication.

<Explanation of an Operation>

The entirety of the operation by each device in the case that the wireless LAN network 103 is selected as an access network in this embodiment will be explained by making a reference to a configuration of the wireless communication control system of FIG. 1.

Each of the wireless LAN base station devices 107 to 109 that are being monitored by the wireless LAN base station monitoring server device 105 notifies the wireless LAN base station information of its own base station, for example, the position information of the wireless LAN base station, the bandwidth occupation situation, the base station information necessary for a connection, or the like to the wireless LAN base station monitoring server device 105. Communication between each of the wireless LAN base station devices 107 to 109 and the wireless LAN base station monitoring server device 105 is made via the internet 101, and the 3G network 102, the wireless LAN network 103, the wire network, etc. are thinkable as an access network that is used at that moment.

Herein, the so-called wireless LAN base station information is information that becomes necessary when the combined wireless terminal device 113 is to set up a connection to the corresponding wireless LAN base station, for example, the position information of its own base station, the information associated with the wireless link quality information such as the bandwidth occupation situation, or the like. In the standard specification 802.11 of the wireless LAN, the number of times of retransmission has been already specified for each terminal with regard to the bandwidth occupation information, and the above specification becomes an index for the communication situation of the wireless LAN base station. Further, in 802.11e, "Station Count", "Channel Utilization", and "Available Admission Capacity" have been specified with a parameter element that is called QBSS Load element. The information such as a delay and a packet loss may be stored as an index for the wireless link quality of the base station besides the bandwidth occupation information.

The combined wireless terminal device 113, which is to commence communication, requests the wireless LAN base station information of the wireless LAN base station device 109 to which the its own terminal 113 and the communication partner wireless terminal 114 are connectable, for example, the position information of the wireless LAN base station, the information associated with the wireless link quality such as the bandwidth occupation situation, the base station information necessary for a connection, or the like. At that moment, the combined wireless terminal device 113 may notify the position information of its own terminal and the communication partner wireless terminal to the wireless LAN base station monitoring server device 105, and further, the wireless LAN base station monitoring server device 105 can notify the information of the wireless LAN base station in the vicinity of the above combined wireless terminal device 113 to the above combined wireless terminal device 113 based upon its position information.

The wireless LAN base station monitoring server device 105 notifies information as to whether or not the connectable base station device exists, and if it exists, its wireless LAN base station information, for example, the position information of the wireless LAN base station, the information associated with the wireless link quality such as the bandwidth occupation situation, the base station information necessary for a connection, or the like, based upon the information obtained from the combined wireless terminal device 113 having requested the information. The combined wireless terminal device 113 having received the wireless LAN base station information decides whether or not to set up a connection to the wireless LAN network 103 from the wireless LAN base station information.

When the wireless LAN base station device to which the communication partner wireless terminal 114 is connectable does not exist, or when it is estimated that the required wireless link quality cannot be obtained judging from a high bandwidth occupation ratio or the like even though the communication partner wireless terminal 114 is connectable to the wireless LAN base station also in the case that the wireless LAN base station to which the its own terminal 113 is connectable exists, and yet there is a sufficient vacancy in the band thereof, the combined wireless terminal device 113 selects the 3G network 102 without setting up a connection to the wireless LAN network 103. When the combined wireless terminal device 113 selects the wireless LAN network 103 as an access network, it starts the transmission/reception function of the wireless LAN. Thereafter, it reverts to the desired wireless LAN base station device 107, and commences the wireless LAN communication. At the moment that a series of the transmission/reception is finished, the combined wireless terminal device 113 cancels reversion to the wireless LAN base station device 107, cancels the start of the wireless LAN transmission/reception function, and returns to the normal communication of only the 3G network 102. Herein, the frame having information necessary for controlling communication as data may be transmitted/received through the 3G network 102 at any time irrespective of the situation of the wireless LAN communication in the combined wireless terminal device 113 because the above frame demands not the high-rate communication but the stabilized communication. To do so enables the communication to be made in a stabilized manner.

Next, an operation inside the combined wireless terminal device 113 ranging from the detection of a trigger for commencing communication to the selection of the connection network and the communication commencement will be explained in details by making a reference to a configuration view of the combined wireless terminal device 113 of FIG. 4.

At first, the communication commencement trigger determination unit 404 detects the trigger for commencing communication from the application function unit 403. The communication commencement trigger determination unit 404 notifies the communication commencement to the wireless LAN connection determination unit 405, the terminal position detection function unit 408, and the communication partner terminal information detection unit 410.

The wireless LAN base station information detection unit 407 acquires the information of the wireless LAN base station to which the its own terminal 113 and the wireless terminal 114 of the communication partner are connectable, for example, the position information of the wireless LAN base station, the information associated with the wireless link quality such as the bandwidth occupation situation, the base station information necessary for a connection, or the like through the 3G communication function unit 402 or through the wireless LAN communication function unit 401, and stores it in the wireless LAN base station information storage unit 406. At the moment that the wireless LAN base station information detection unit 407 acquires the information of the wireless LAN base station device to which the its own terminal 113 is connectable, the terminal position detection unit 408 may detect a position of its own terminal.

Continuously, the wireless LAN connection determination unit 405 acquires the information of the wireless LAN base station to which the its own terminal 113 and the communication partner wireless terminal 114 are connectable, for example, the position information of the wireless LAN base station, the information associated with the wireless link quality such as the bandwidth occupation situation, the base station information necessary for a connection, or the like from the wireless LAN base station information storage unit 406, and determines whether or not to set up a connection to the wireless LAN network 103. The decided connection network is notified to the data control unit 409.

When the combined wireless terminal device 113 has selected the wireless LAN network 103, herein, it starts the wireless LAN transmission/reception function. The application function unit 403 does not directly receive/deliver the packet from/to the wireless LAN communication function unit 401 during communication, but the data control unit 409 transmits/receives the packet via the wireless LAN communication function unit.

When the wireless LAN network 103 has not been selected as an access network, the data control unit 409 transmits/receives the frame via the 3G communication function unit 402.

Additionally, in the foregoing explanation, the combined wireless terminal device 113 decided the access network by taking the wireless LAN base station information and the terminal position information as a determination material. However, the combined wireless terminal device 113 notifies the required wireless link quality and the terminal position information to the wireless LAN base station monitoring server device 105 through the 3G communication function unit 402 or through the wireless LAN communication function unit 401, and thereby, the wireless LAN base station monitoring server device 105 may bear one part of the function of selecting the access network to which the corresponding combined wireless terminal device 113 sets up a connection from the information of the connectable wireless LAN base station information, for example, the position information of the wireless LAN base station, the information associated with the wireless link quality such as the bandwidth occupation situation, the base station information necessary for a connection, and the terminal position information.

As mentioned above, in this embodiment, the information of the wireless LAN base station device in the vicinity of the communication partner wireless terminal 114 can be obtained. Thereupon, when the wireless LAN base station to which the communication partner wireless terminal is connectable does not exist, or when there is less vacancy in the band if it exists even though there is a sufficient vacancy in the band of the wireless LAN base station device to which its own terminal can revert, the combined wireless terminal device 113 makes communication by employing the 3G network 102. Thus, taking the wireless LAN as an access network only on the condition that the wireless LAN base station to which the its own terminal 113 and the communication partner wireless terminal 114 are connectable exists and yet there is a sufficient vacancy in the band makes it possible to suppress the power consumption due to the wireless LAN communication during communication to a minimum level.

Further, acquiring these items of the information of the wireless LAN base station device etc. through the 3G makes it possible to suppress the power consumption due to the scan. The wasteful power consumption at the time of the start can be suppressed because the start of the wireless LAN transceiver is cancelled when a series of the communication is finished. In addition hereto, the wasteful occupation of the band can be prevented, which also leads to an effective utilization of the band.

EXAMPLE 1

Next, the example 1 of the present invention will be explained by making a reference to the accompanied drawings. This example 1 corresponds to the foregoing first embodiment.

Figure 5:
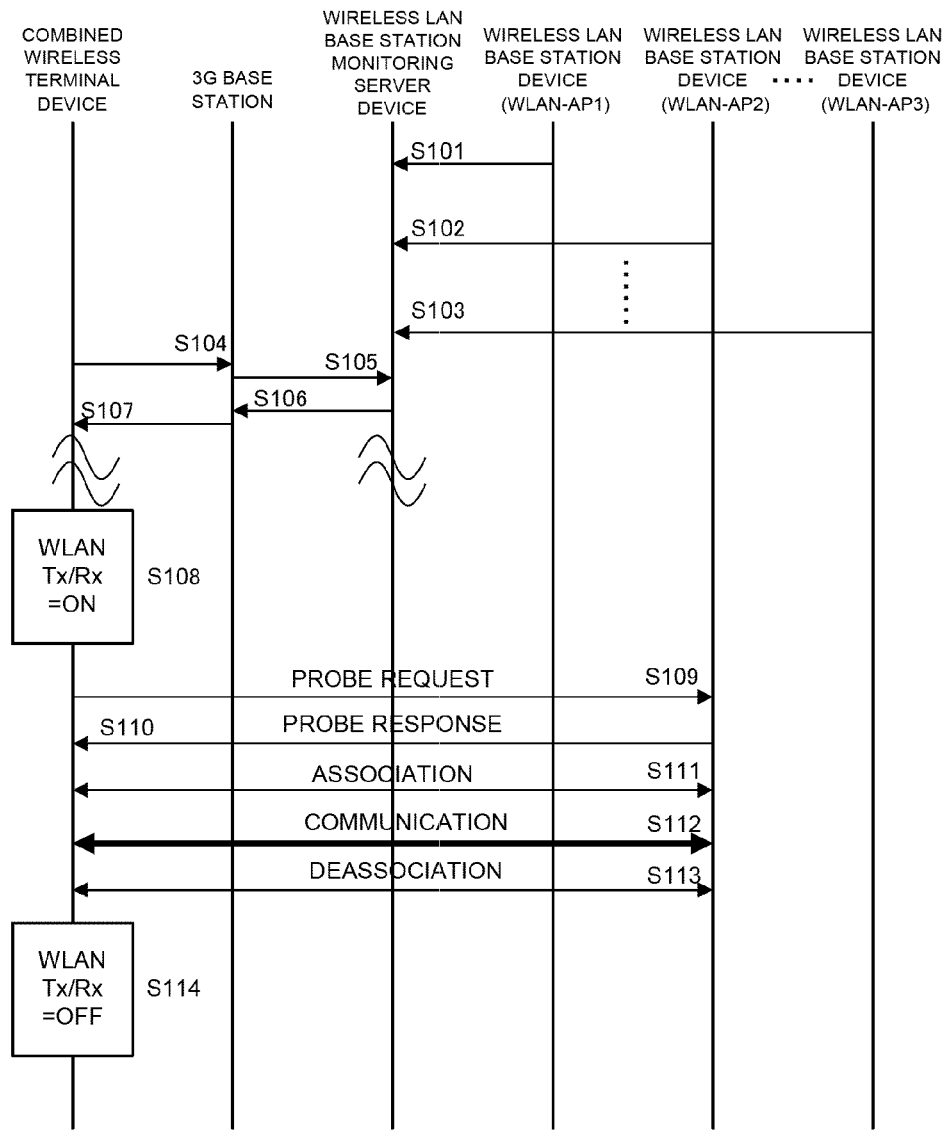
FIG. 5 is a sequence diagram illustrating an operation of the first embodiment of the present invention.

FIG. 5 is a sequence diagram of an entire operation of each device ranging from the selection of the wireless LAN network 103 upon receipt of a trigger for commencing communication to the finishing of the communication.

Each of the wireless LAN base station devices 107 to 109 that are being monitored by the wireless LAN base station monitoring server device 105 notifies the wireless LAN base station information of its own base station, for example, the position information of the wireless LAN base station, the bandwidth occupation situation, the base station information necessary for a connection, or the like to the wireless LAN base station monitoring server device 105 (S101 to S103). At that moment, communication between each of the wireless LAN base station devices 107 to 109 and the wireless LAN base station monitoring server device 105 is made via the internet 101, and the access network that is used at that moment could be the 3G network 102, the wireless LAN network 103, the wire network, or the like.

The combined wireless terminal device 113, which is to commence communication, notifies the position information of its own terminal 113 and the communication partner wireless terminal 114 to the wireless LAN base station monitoring server device 105 through the 3G base station device 104, and requests the wireless LAN base station information of the connectable wireless LAN base station device that is located in the vicinity of the above combined wireless terminal device 113, for example, the position information of the wireless LAN base station, the information associated with the wireless link quality such as the bandwidth occupation situation, the base station information necessary for a connection, or the like (S104 and S105).

The wireless LAN base station monitoring server device 105 notifies information as to whether or not the base station device to which the combined wireless terminal device 113 and the communication partner wireless terminal device 114 are connectable exists, and if it exists, its wireless LAN base station information based upon the information obtained from the combined wireless terminal device 113 having requested the information to the combined wireless terminal device 113 through the 3G network 102 (S106 and S107). Herein, the wireless LAN base station information being notified is a position of the wireless LAN base station, information associate with the wireless link quality such as the bandwidth occupation situation of the above wireless LAN base station, and base station information for necessary for a connection. As a bandwidth occupation situation, there exist an average number of times of re-transmission, QBSS Load (Station Count, Channel Utilization, a residual quantity of Medium Time), etc.

The combined wireless terminal device 113 having received the wireless LAN base station information of the its own terminal 113 and the communication partner wireless terminal device 114 decides whether or not to set up a connection to the wireless LAN from the wireless LAN base station information. When it is estimated that the required wireless link quality cannot be obtained and the wasteful bandwidth occupation occurs even though the wireless LAN base station to which its own terminal is connectable exists, judging from the bandwidth occupation situation of the wireless LAN base station device being positioned in the vicinity of the wireless terminal of the communication partner, the combined wireless terminal device 113 selects to make communication using the 3G network 102 without setting up a connection to the wireless LAN network 103. With regard to determination of the connection based upon the bandwidth occupation situation, for example, when the information of the bandwidth occupation situation is an average number of times of re-transmission, the combined wireless terminal device 113 determines that a medium is stable if the number of times of re-transmission is three or less and decides a connection to the wireless LAN because a default value thereof is seven. Further, in the case that the information of the bandwidth occupation situation is "Station Count" and the connection specification of the wireless LAN is IEEE 802.11b, a connection to the wireless LAN is decided when the number of the connected terminals is five or less. Further, in the case that the information of the bandwidth occupation situation is "Station Count" and the connection specification of the wireless LAN is IEEE 802.11g, a connection to the wireless LAN is decided when the number of the connected terminals is 15 or less. Further, in the case that the information of the bandwidth occupation situation is "Channel Utilization", a connection to the wireless LAN is decided when it is 50% or less.

The combined wireless terminal device 113 having selected the wireless LAN network 103 as an access network starts the transmission/reception function of the wireless LAN (S108).

Thereafter, the combined wireless terminal device 113 detects the desired wireless LAN base station device 107 after transmission of a "Probe request" frame and reception of the "Probe request" frame (S109 and S110), and commence the wireless LAN communication (S111 and S112).

At the moment that a series of the transmission/reception is finished, the combined wireless terminal device 113 cancels reversion to the wireless LAN base station (107) by transmitting/receiving a "DeAssociation" frame (S113), cancels the start of the wireless LAN transmission/reception function (S114), and returns to the normal communication of only the 3G network 102. Herein, the communication associated with information necessary for controlling communication may be made at any time through the 3G network 102 irrespective of the situation of the wireless LAN communication in the combined wireless terminal device 113 because the above frame demands not the high-rate communication but the stabilized communication. To do so enables the communication of the information necessary for controlling the communication to be made in a stabilized manner.

Figure 6:
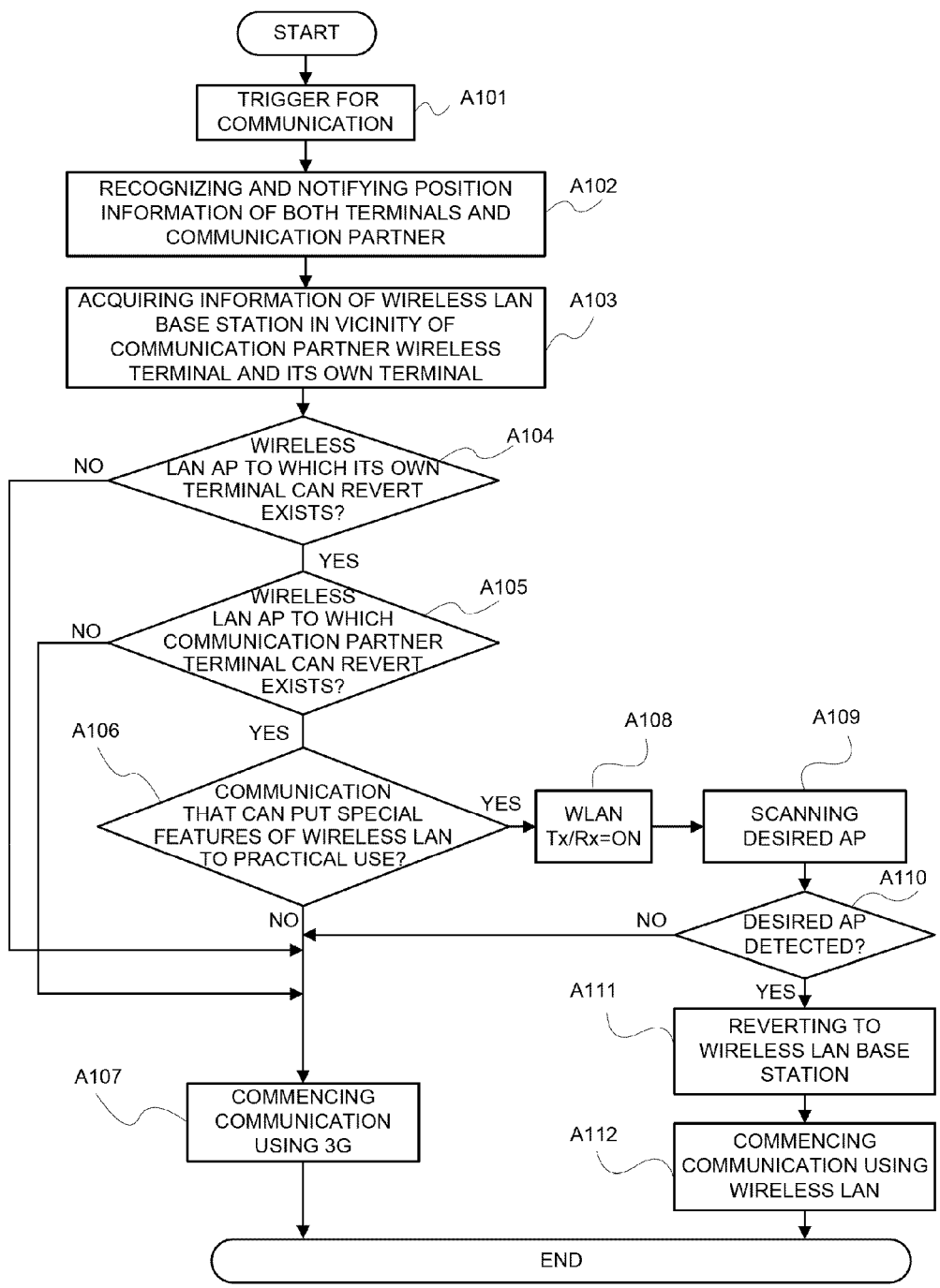
FIG. 6 is a flowchart illustrating an operation of the combined wireless terminal at the moment of selecting an access network and commencing communication, out of operations in the first embodiment of the present invention.

Next, an operation that the combined wireless terminal device 113 of this example 1 selects the access network, and commence communication will be explained in details by making a reference to a flowchart of FIG. 6 and a configuration view of the combined wireless terminal device 113 of FIG. 4. FIG. 6 is a flowchart illustrating an operation of the combined wireless terminal device 113 ranging from the trigger for commencing communication and the determination for selecting the access network being made at that moment to the communication commencement.

At first, the combined wireless terminal device 113 commences a procedure for selecting the communication network with a start of the application by a user taken as a trigger for commencing communication (step A101). And, the combined wireless terminal device 113 acquires position information of its own terminal, and notifies this position information of its own terminal and information for specifying the wireless terminal of the communication partner to the wireless LAN base station monitoring server device 105 through the 3G communication function unit 402 or the wireless LAN communication function unit 401 (step A102). And, the combined wireless terminal device 113 receives the information of the wireless LAN base station to which its own terminal and the wireless terminal device of the communication partner are connectable, for example, the information associated with the communication such as the bandwidth occupation situation, the base station information necessary for a connection, or the like (step A103). The band information, out of pieces of the wireless LAN base station information being received herein, is the number of times of re-transmission addressed to each terminal device, the number of reversion terminals, or the like, and there is no limit to the band information so long as it is a parameter associated with the wireless link quality such as the band control.

Next, the combined wireless terminal device 113 determines whether the wireless LAN base station to which it is connectable exists from the information of the wireless LAN base stations to which its own terminal can revert, out of the wireless LAN base station information (step A104). In addition hereto, the combined wireless terminal device 113 determines whether the wireless LAN base station to which it is connectable exists from the information of the wireless LAN base stations to which the wireless terminal device 114 of the communication partner can revert, out of the wireless LAN base station information (step A105).

The combined wireless terminal device 113 makes communication using the 3G network 102 without selecting the wireless LAN network 103 as a connection network when the wireless LAN base station to which it can revert does not exist (step A107).

On the other hand, the combined wireless terminal device 113 determines whether special features of the wireless LAN can be put to practical use from the information associated with the wireless link quality such as the band information when the wireless LAN base station to which it can revert exists (step A106). For example, the quality cannot be obtained when the bandwidth occupation ratio is high even though the connectable wireless LAN base station exists, so the combined wireless terminal device 113 selects a connection to the 3G network 102 without setting up a connection to the wireless LAN network 103, and when it can be predicted that the wireless link quality can be obtained because the bandwidth occupation ratio is low, the combined wireless terminal device 113 selects a connection to the wireless LAN network 103.

When the combined wireless terminal device 113 has selected communication using the wireless LAN, it starts the transmission/reception function of the wireless LAN communication that has not been started so far (step A108), and after detecting/reverting to the connectable wireless LAN base station pre-notified from the wireless LAN base station monitoring server device 105 (step A109 to step A111), it makes communication with the wireless LAN network 103 taken as an access network (step A112). Herein, the frame having information necessary for controlling communication as data may be transmitted/received through the 3G network 102 at any time irrespective of the situation of the wireless LAN communication in the combined wireless terminal device 113 because the above frame demands not the high-rate communication but the stabilized communication. To do so enables the communication of the frame to be made in a stabilized manner.

In addition hereto, an operation of the combined wireless terminal device 113 at the time of finishing communication will be explained by employing FIG. 7.

The combined wireless terminal device 113, upon receipt of a trigger for finishing communication from the application function unit 403 (step A201), cancels reversion to the wireless LAN base station device 107 (step A202), and cancels the start of the wireless LAN transmission/reception function (step A203).

Figure 8:
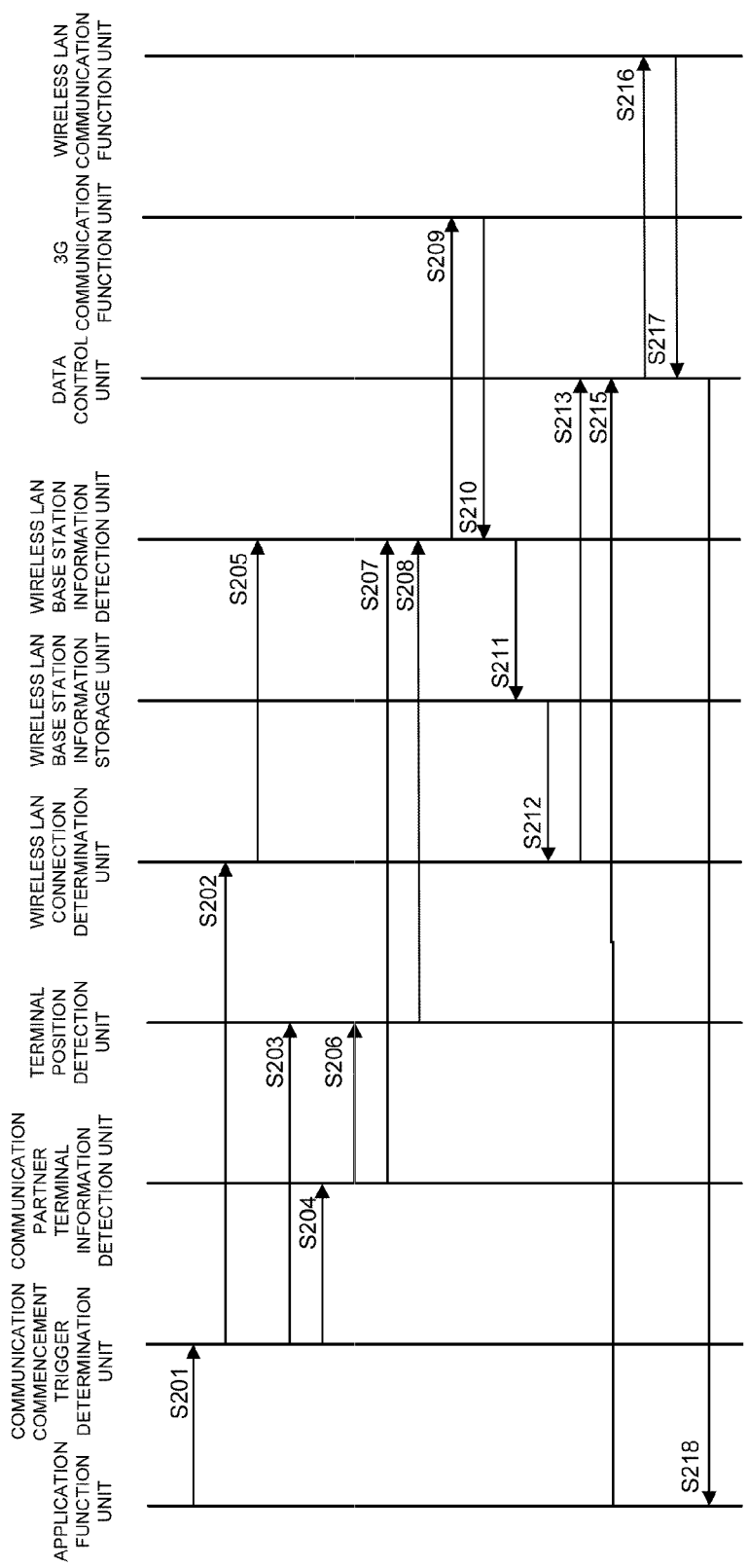
FIG. 8 is a sequence diagram illustrating an operation within the combined wireless terminal device of the first embodiment of the present invention.

Herein, an operation of the combined wireless terminal device 113 ranging from the trigger for commencing communication to the selection of the connection network and to the communication commencement will be explained in details. FIG. 8, which is a sequence diagram of an operation inside the combined wireless terminal device 113 ranging from the trigger for commencing communication to the selection of the connection network and to the communication commencement, illustrates the case that the wireless LAN network 103 has been selected as an access network.

At first, the application function unit 403 notifies the trigger for commencing communication to the communication commencement trigger determination unit 404 (S201).

The communication commencement trigger determination unit 404 notifies the communication commencement to the wireless LAN connection determination unit 405, the terminal position detection function unit 408, and the communication partner terminal information detection unit 410 (S202 to S204). The terminal position detection unit 408, upon receipt of the trigger for commencing communication, detects the position of its own terminal.

The wireless LAN connection determination unit 405 requests the wireless LAN base station information detection unit 407 to acquire the wireless LAN base station information of the its own terminal 113 and the wireless terminal device 114 of the communication partner in order to determine whether or not to set up a connection to the wireless LAN (S205).

The communication partner terminal information detection unit 410, upon receipt of the trigger for commencing communication, identifies the communication partner, and requests the terminal position detection function unit 408 to detect the position information of the above communication partner wireless terminal 114 (S206). Further, the communication partner terminal information detection unit 410 requests the wireless LAN base station information detection unit 407 to acquire the information of the wireless LAN base station in the vicinity of the communication partner wireless terminal 114 (S207). The terminal position detection function unit 408, upon receipt of a request by the communication commencement trigger determination unit 404 and the communication partner terminal information detection unit 410, detects the position information of the its own terminal 113 and the communication partner wireless terminal 114, notifies its position information to the wireless LAN base station information detection unit 407 (S208).

The wireless LAN base station information detection unit 407 notifies the position information of the its own terminal 113 and the communication partner wireless terminal 114 notified by the terminal position detection unit 408 to the wireless LAN base station monitoring server device 105 through the 3G communication function unit 402 (S209).

Further, the wireless LAN base station information detection unit 407 acquires the information of the wireless LAN base station to which the its own terminal 113 and the wireless terminal device 114 of the communication partner are connectable from the wireless LAN base station monitoring server device 105 through the 3G communication function unit 402 (S210), and stores it in the wireless LAN base station information storage unit 406 (S211).

The wireless LAN connection determination unit 405 acquires the above information from the wireless LAN base station information storage unit 406 (S212), and determines whether or not to set up a connection to the wireless LAN network 103. A determination result is notified to the data control unit 409 (S213).

Herein, when the wireless LAN communication has been selected, the combined wireless terminal device 113 starts the wireless LAN transmission/reception function. At the moment of transmission, the application function unit 403 delivers the packet to the data control unit 409 without directly delivering it to the wireless LAN communication function unit 401 (S214), and the data control unit 409 transmits it to the wireless LAN communication function unit 401 (S215). At the moment of reception, the data control unit 409 receives the packet from the wireless LAN communication function unit 401 (S216), and the data control unit 409 delivers the packet to the application function unit 403 (S217).

On the other hand, when the wireless LAN network 103 has not been selected as an access network, the data control unit 409 transmits/receives the frame via the 3G communication function unit 402. Herein, the communication associated with information necessary for controlling communication may be transmitted/received through the 3G network 102 at any time irrespective of the situation of the wireless LAN communication in the combined wireless terminal device 113.

A second embodiment will be explained.

The second embodiment differs from the first embodiment in a point that the wireless LAN base station monitoring server device 105 bears the function of acquiring the wireless terminal information of the communication partner that the combined wireless terminal device 113 in the foregoing first embodiment has borne.

<Explanation of the Wireless LAN Base Station Monitoring Server Device 105>

Figure 9:
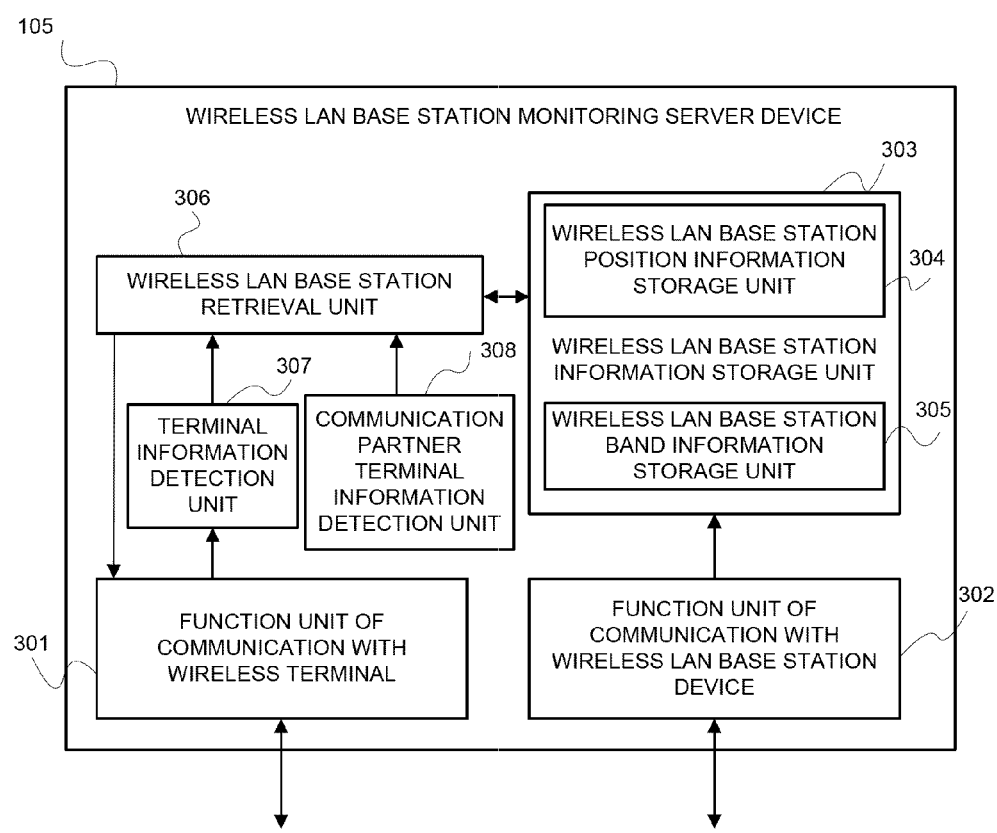
FIG. 9 is a view illustrating a configuration of the wireless LAN base station monitoring server device in a second embodiment of the present invention.

FIG. 9 is a view illustrating the wireless LAN base station monitoring server 105 in the second embodiment. Upon making a reference to FIG. 9, it differs from the wireless LAN base station monitoring server 105 in the first embodiment shown in FIG. 3 in a point of including a communication partner terminal information detection unit 308. The terminal position information detection unit 307 detects the position information of the combined wireless terminal device 113 from the combined wireless terminal device 113 through the function unit 301 of communication with the combined wireless terminal. On the other hand, the communication partner terminal information detection unit 308 acquires the information of the combined wireless terminal device 113 that is to commence the communication from the terminal information detection unit 307, and detects the information of the wireless terminal 114 of the communication partner of the combined wireless terminal device 113. The wireless LAN base station retrieval unit 306 acquires the position information of the combined wireless terminal device 113 and the wireless terminal device 114 of the communication partner thereof from the terminal position information detection unit 307 and the communication partner terminal information detection unit 308, compares the above information with the wireless LAN base station information acquired from the wireless LAN base station information storage unit 304, and retrieves the wireless LAN base station of the 3G cell 106 in the vicinity of the above combined wireless terminal device 113 and the wireless terminal device 114, being a communication partner thereof. And, the wireless LAN base station retrieval unit 306 notifies the information as to whether or not the wireless LAN base station in the vicinity of the above combined wireless terminal device 113 and the wireless terminal 114, being a communication partner thereof, exists, and if it exists, the above wireless LAN base station information, for example, the position information, the information associated with the wireless link quality such as the bandwidth occupation situation, the base station information necessary for a connection, or the like to the combined wireless terminal device 113 through the internet 101. At that moment, communication between each of the wireless LAN base station devices 107 to 109 and the wireless LAN base station monitoring server device 105 is made via the internet 101, and the 3G network 102, the wireless LAN network 103, the wire network means, etc. are thinkable as an access network that is used at that moment. When communication is made by using the 3G network 102, the function unit 301 of communication with the 3G network and the function unit 302 of communication with the wireless LAN base station device become identical to each other. Additionally, herein, the internet 101 does not always need to be the so-called "The Internet", and the networks of other types such as an exclusive network line being provided by a communication enterprise do not cause any problem. Further, the wireless LAN base station monitoring server device 105 as well is not always arranged at a position in which a connection to the internet 101 is made, but the wireless LAN base station monitoring server device 105 can be arranged also at a position in which a connection to the 3G network 102 or the wireless LAN network 103 is made.

<Explanation of the Combined Wireless Terminal Device 113>

Figure 10:
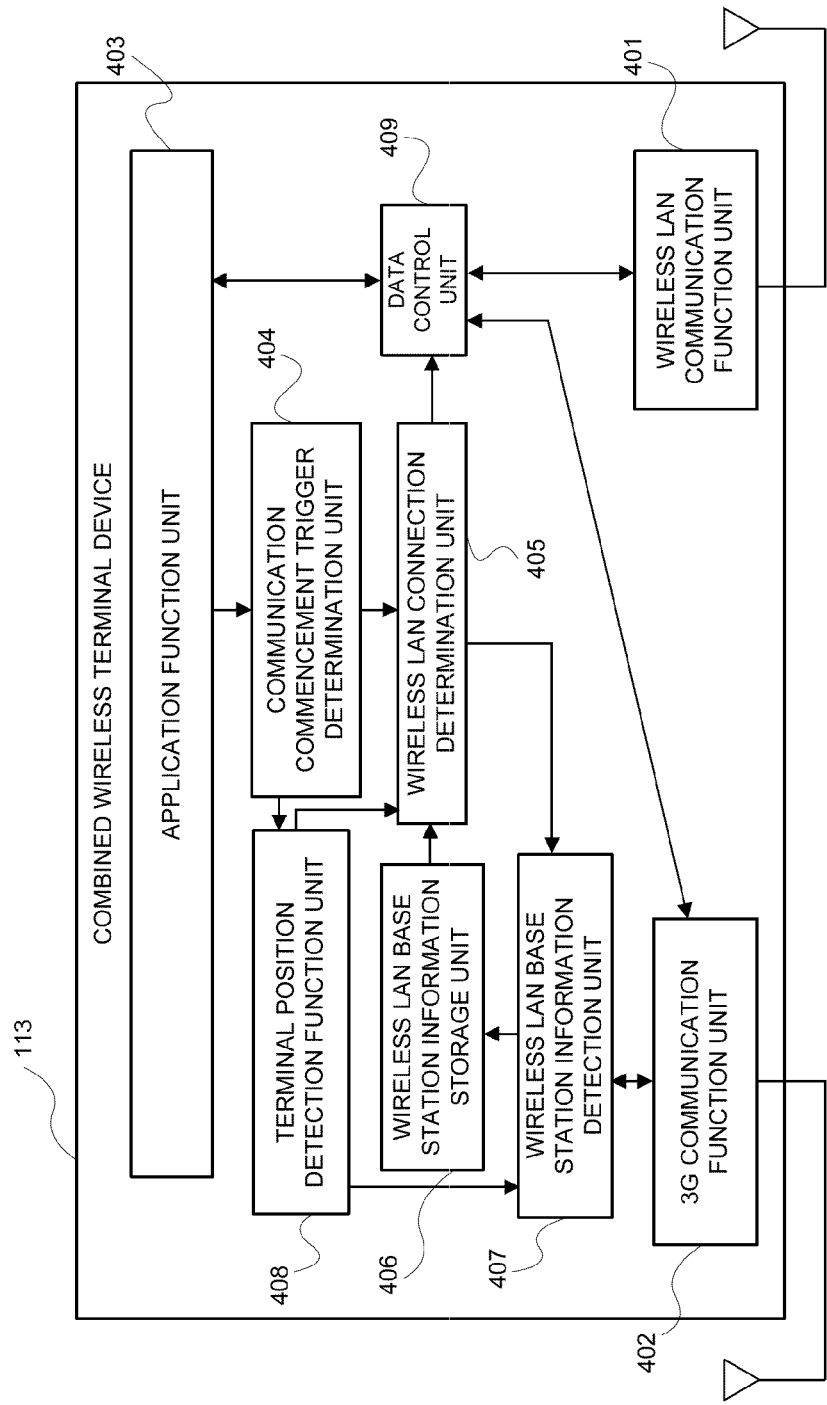
FIG. 10 is a view illustrating a configuration of the combined wireless terminal device of the second embodiment of the present invention.

FIG. 10 is a view illustrating the combined wireless terminal device 113 in the second embodiment. Upon making a reference to FIG. 10, it differs from the combined wireless terminal device 113 in the first embodiment shown in FIG. 4 in a point of not including the communication partner terminal information detection unit 410.

The communication commencement trigger determination unit 404, upon receipt of information on as a start etc. of the application relating to a communication commencement from the application function unit 403, determines the communication commencement.

The wireless LAN connection determination unit 405, upon receipt of a communication commencement notification from the communication commencement trigger determination unit 404, requests the wireless LAN base station information detection unit 407 to acquire the wireless LAN base station information in order to determine the wireless LAN connection.

The terminal position detection unit 408, upon receipt of a request for detecting the position of the its own terminal 113 from the communication commencement trigger determination unit 404, and a request for detecting the position of the communication partner from the communication partner terminal information detection unit, detects respective positions. As a method of detecting a position of the terminal, the method of acquiring GPS information, the method of specifying a position of the terminal based upon information of the cell in which the terminal is located, or the like is thinkable.

The wireless LAN base station information detection unit 407 having received the request for acquiring the wireless LAN base station information of the its own terminal 113 acquires the positions of the its own terminal 113 detected by the terminal position detection unit 408, and notifies this position information to the wireless LAN base station monitoring server device 105 of FIG. 9 mentioned above through the 3G communication function unit 402 or through the wireless LAN communication function unit 401. On the other hand, the wireless LAN base station information detection unit 407 acquires the information of the wireless LAN base station to which the its own terminal 113 and the communication partner wireless terminal 114 are connectable, for example, the position information of the wireless LAN base station, the information associated with the wireless link quality such as the bandwidth occupation situation, the base station information necessary for a connection, or the like from the wireless LAN base station monitoring server device 105 through the 3G communication function unit 402 or through the wireless LAN communication function unit 401, and stores it in the wireless LAN base station information storage unit 406. In the figure, the case of acquiring the position information of the wireless LAN base station, the information associated with the wireless link quality such as the bandwidth occupation situation, the base station information necessary for a connection, or the like through the 3G communication function unit 402 was mentioned; however it does not matter to acquire it through the wireless LAN communication function unit 401.

The wireless LAN connection determination unit 405 acquires the band information of the wireless LAN base station device to which the its own terminal 113 and the communication partner wireless terminal 114 are connectable from the wireless LAN base station information storage unit 406 and the terminal position detection function unit 408, and determines whether or not to select the wireless LAN as a communication network. Additionally, the required wireless link quality at which a connection to the wireless LAN is permitted may be pre-stored in the wireless LAN connection determination unit 405 to determine the connection based upon this required wireless link quality, and further, the wireless link quality may be tinged with the application being used (a web application or a voice application) and other elements to actively prepare the required wireless link quality and to determine the connection based upon this required wireless link quality.

<Explanation of an Operation>

The entirety of the operation by each device in the case that the wireless LAN network 103 is selected as an access network in this embodiment is identical to that of the embodiment 1, so its explanation is omitted.

Next, an operation inside the combined wireless terminal device 113 ranging from the detection of a trigger for commencing communication to the acquisition of the wireless LAN base station information for a purpose of selecting the connection network will be explained with a difference with the embodiment 1 placed at a center by making a reference to a configuration view of the combined wireless terminal device 113 of FIG. 10.

At first, the communication commencement trigger determination unit 404 detects the trigger for commencing communication from the application function unit 403. The communication commencement trigger determination unit 404 notifies the communication commencement to the wireless LAN connection determination unit 405 and the terminal position detection function unit 408.

The wireless LAN base station information detection unit 407 acquires the information of the wireless LAN base station to which the its own terminal 113 and the wireless terminal 114 of the communication partner are connectable through the 3G communication function unit 402 or through the wireless LAN communication function unit 401, and stores it in the wireless LAN base station information storage unit 406. At the moment that the wireless LAN base station information detection unit 407 acquires the information of the wireless LAN base station device to which the its own terminal 113 is connectable, the terminal position detection unit 408 may detect a position of its own terminal.

As mentioned above, also in this embodiment, the information of the wireless LAN base station device in the vicinity of the communication partner wireless terminal 114 can be acquired. Thereupon, when the wireless LAN base station to which the communication partner wireless terminal is connectable does not exist, or when there is less vacancy in the band if it exists even though there is a sufficient vacancy in the band of the wireless LAN base station device to which its own terminal can revert, the combined wireless terminal device 113 makes communication by employing the 3G network 102. Thus, taking the wireless LAN as an access network only on the condition that the wireless LAN base station to which the its own terminal 113 and the communication partner wireless terminal 114 are connectable exists and yet there is a sufficient vacancy in the band makes it possible to suppress the power consumption due to the wireless LAN communication during communication to a minimum level. Further, acquiring these items of the information of the wireless LAN base station device etc. through the 3G makes it possible to suppress the power consumption due to the scan. The wasteful power consumption at the time of the start can be suppressed because the start of the wireless LAN transceiver is cancelled when a series of the communication is finished. In addition hereto, the wasteful occupation of the band can be prevented, which also leads to an effective utilization of the band.

EXAMPLE 2

Next, the example 2 of the present invention will be explained by making a reference to the accompanied drawings. This example 2 corresponds to the foregoing second embodiment.

An entire operation of each device ranging from the selection of the wireless LAN network 103 upon receipt of a trigger for commencing communication to the finishing of the communication is identical to that of a sequence diagram of FIG. 5.

Figure 11:
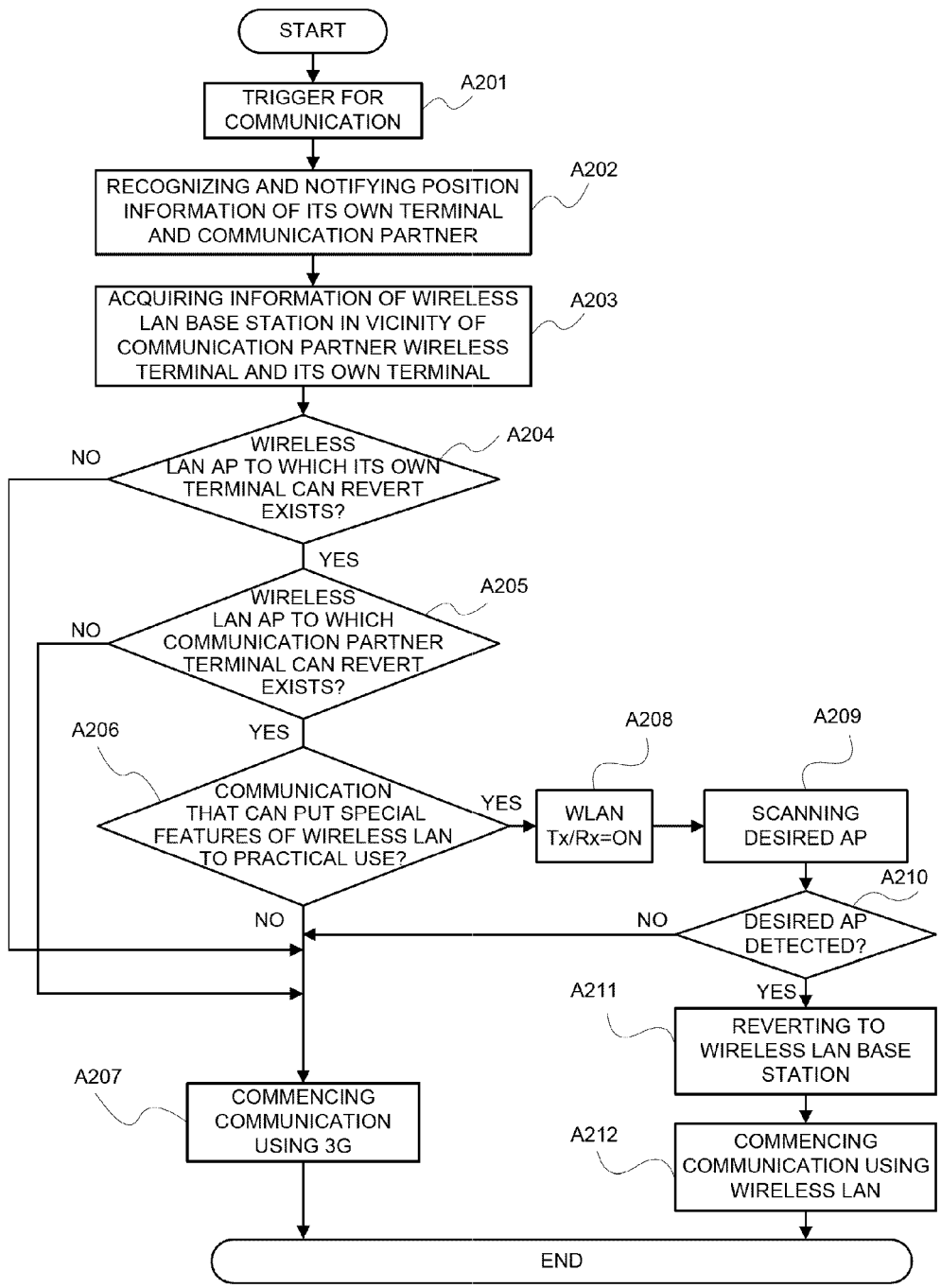
FIG. 11 is a flowchart illustrating an operation of the combined wireless terminal at the moment of selecting an access network and commencing communication, out of operations in the second embodiment of the present invention.

Next, an operation in which the combined wireless terminal device 113 of this example 2 selects an access network and commences communication will be explained with a difference with the example 1 placed at a center by making a reference to a flowchart of FIG. 11 and a configuration view of the combined wireless terminal device 113 of FIG. 10. FIG. 11 is a flowchart illustrating an operation of the combined wireless terminal device 113 ranging from the trigger for commencing communication and the determination for selecting the access network being made at that moment to the communication commencement.

At first, the combined wireless terminal device 113 commences a procedure for selecting the communication network with a start of the application by a user taken as a trigger for commencing the communication (step A201). And, the combined wireless terminal device 113 acquires the position information of its own terminal, and notifies this position information of only its own terminal to the wireless LAN base station monitoring server device 105 through the 3G communication function unit 402 or through the wireless LAN communication function unit 401 (step A202). In the example 1, at this time, the information of the wireless terminal device 114, being a communication partner of the combined wireless terminal device 113 that is to commence the communication, and its position information were also detected; however, in the present invention, the position information of only the combined wireless terminal device 113 is detected/notified. The step subsequent hereto is similar to that of the example 1, so its explanation is omitted.

Figure 7:
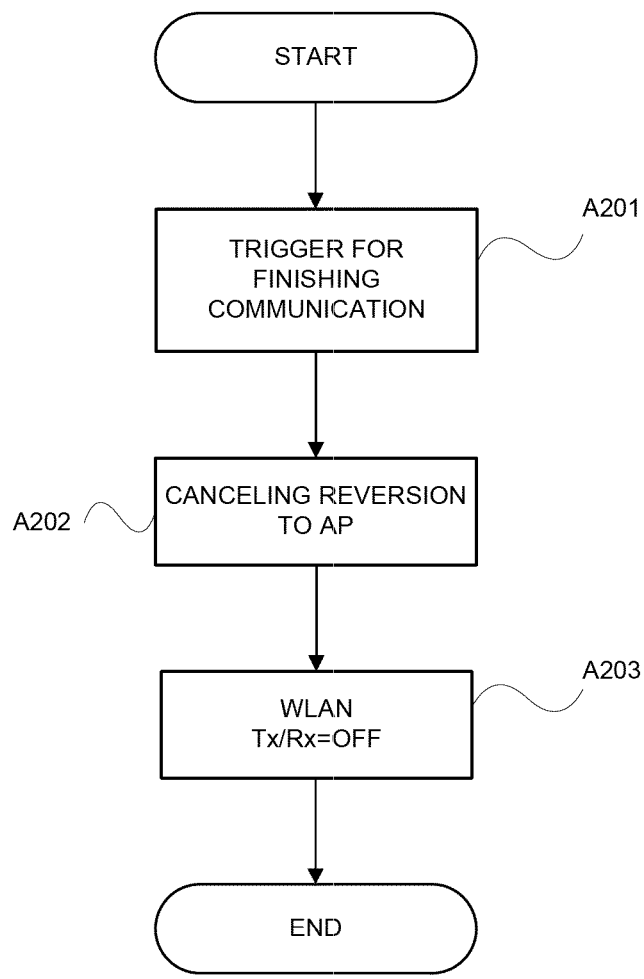
FIG. 7 is a flowchart illustrating an operation of the combined wireless terminal at the moment of finishing communication, out of operations in the first embodiment of the present invention.

An operation of the combined wireless terminal 113 at the moment of finishing communication is similar to that of FIG. 7 in the example 1.

Figure 12:
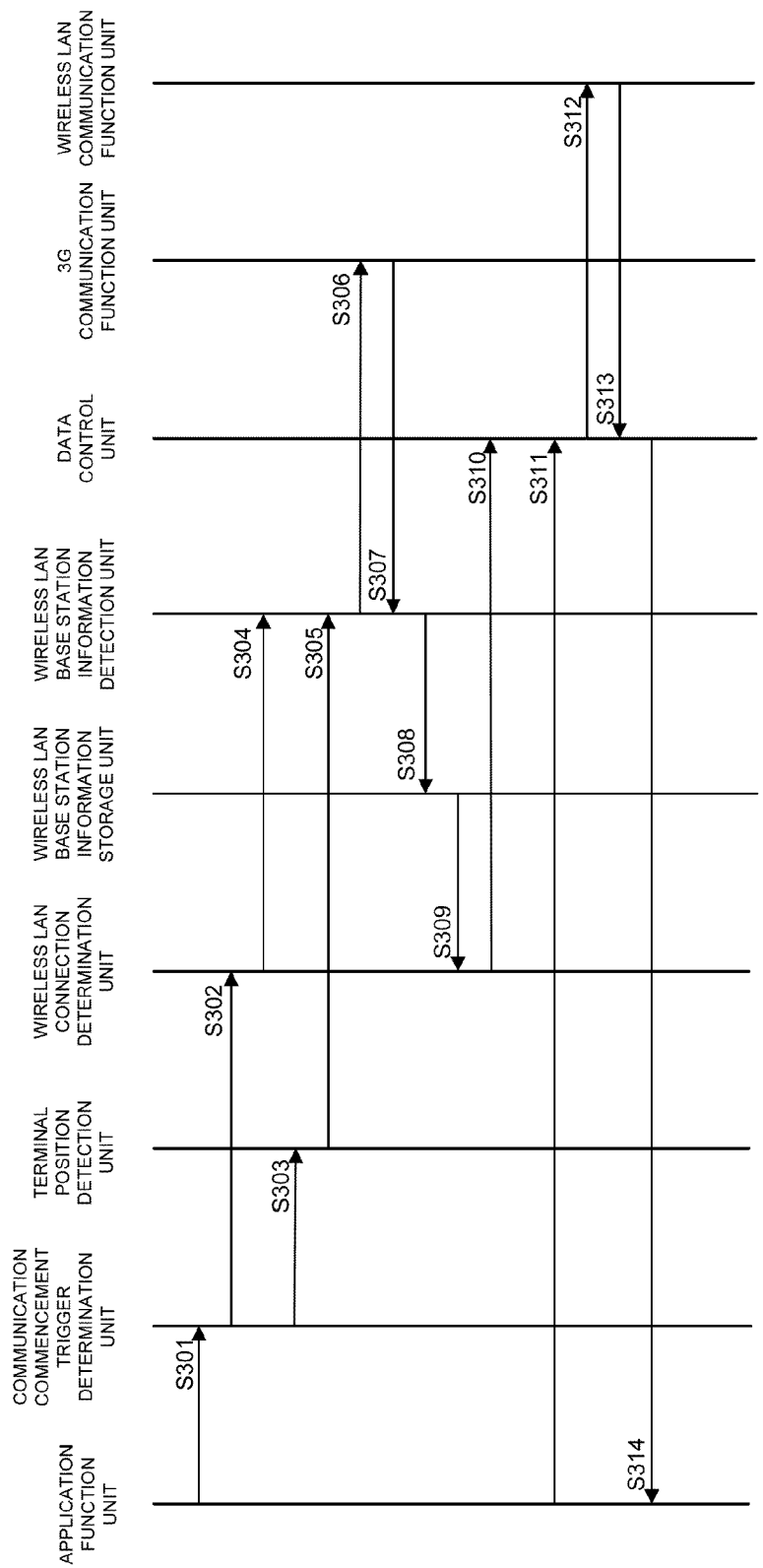
FIG. 12 is a sequence diagram illustrating an operation within the combined wireless terminal device in the second example of the present invention.

Herein, an operation inside the combined wireless terminal device 113 ranging from the trigger for commencing communication to the selection of the connection network and to the communication commencement will be explained in details with a difference with that of FIG. 8 in the example 1 placed at a center. FIG. 12, which is a sequence diagram of an operation inside the combined wireless terminal device 113 ranging from the trigger for commencing communication to the selection of the connection network and to the communication commencement, illustrates the case that the wireless LAN network 103 has been selected as an access network.

At first, the application function unit 403 notifies the trigger for commencing the communication to the communication commencement trigger determination unit 404 (S301).

The communication commencement trigger determination unit 404 notifies the communication commencement to the wireless LAN connection determination unit 405 and the terminal position detection function unit 408 (S302 and S303). The terminal position detection unit 408, upon receipt of a trigger for commencing the communication, detects the position of its own terminal.

The wireless LAN connection determination unit 405 requests the wireless LAN base station information detection unit 407 to acquire the information of the wireless LAN base station of the its own terminal 113 and the wireless terminal device 114 of the communication partner in order to determine whether or not to set up a connection to the wireless LAN (S304).

The terminal position detection function unit 408, upon receipt of a request from the communication partner terminal information detection unit 410, detects the position information of only the combined wireless terminal device 113, and notifies the above position information to the wireless LAN base station information detection unit 407 (S305).

The wireless LAN base station information detection unit 407 notifies the position information of only the its own terminal 113 notified from the terminal position detection unit 408 to the wireless LAN base station monitoring server device 105 through the 3G communication function unit 402 (S306).

A procedure for acquiring the information of the wireless LAN base station to which the its own terminal 113 and the wireless terminal device 114 of the communication partner are connectable from the wireless LAN base station monitoring server device 105 is similar to that of FIG. 8 in the example 1.

A third embodiment will be explained.

The third embodiment differs from each of the first embodiment and the second embodiment in a respect of having added a point of putting a limit to the packet size etc. being employed for communication by taking the information associated with the wireless link quality such as the bandwidth occupation situation of the wireless LAN base station device 108 to which the wireless terminal device 114 of the communication partner reverts into consideration at the moment the combined wireless terminal device 113 in the foregoing first and second embodiments has employed the band information of the wireless LAN base station device in the vicinity of the wireless terminal device 114 of the communication partner to select the wireless LAN network as a communication network.

Next, a point in which the operation of the third embodiment differs that of each of the first embodiment and the second embodiment, out of the operations inside the combined wireless terminal device 113 that relate to the selection of the connection network, will be explained in details.

A procedure ranging from the detection of a trigger for commencing the communication by the communication commencement trigger determination unit 404 to the selection of the communication using the wireless LAN network by the wireless LAN connection determination unit 405 is similar to that of the embodiment 1 and the embodiment 2.

When the wireless LAN network has been selected as a result of the selection of the communication network, the wireless LAN connection determination unit 405 notifies the information of the band of which an occupation ratio is low, out of the bands of the wireless LAN base station device 114 to which the combined wireless terminal device 113 and the wireless terminal device 114 of the communication partner revert, that is, the information associated with the wireless link quality such as the occupiable band to the application function unit 403 through the data control unit 409.

The application function unit having received a notification of the information associated with the wireless link quality such as the occupiable band of the wireless LAN base station device to which the combined wireless terminal device 113, and the wireless terminal device 114, being a communication partner thereof, that commence the communication revert decides the packet size etc. being generated in the application function unit, based upon the above information. As information that the application function unit decides, the packet size, a use codec with the case of a voice application, a resolution/resolving power with the case of an image/video application, or the like can be listed, and the information is not limited hereto as long as it governs magnitude of the occupation situation of the band.

An operation after commencing the communication is similar to that of the embodiment 1 and the embodiment 2, so its explanation is omitted.

Further, the application information differs application by application, so the similar procedure is performed also in the case that another application is started, and another communication is commenced during communication. Thus, a status in which a connection to the 3G network 102 and a connection to the wireless LAN network 103 are simultaneously set up could occur.

In addition hereto, the communication associated with information necessary for controlling communication may be made through the 3G network 102 at any time irrespective of the situation of the wireless LAN communication in the combined wireless terminal device 113. At the moment that the communication corresponding to all applications is finished, the combined wireless terminal device 113 cancels the start of the wireless LAN transmission/reception function, and returns to the normal communication using only the 3G network 102.

In such a manner, in the third embodiment, notifying the information associated with the wireless link quality such as a bandwidth occupation ratio of the wireless LAN base station device to which both terminals making communication with each other revert to the application, and making the communication according to the bandwidth occupation situation enable the low-efficiency band of the wireless LAN to be effectively utilized.

EXAMPLE 3

The example 3 of the present invention will be explained by making a reference to the accompanied drawings. This example 3 corresponds to the third embodiment.

An entire operation of each device ranging from the selection of the wireless LAN network 103 upon receipt of a trigger for commencing communication to the finishing of the communication is identical to that of a sequence diagram of FIG. 5.

An operation in which the combined wireless terminal device 113 of this example 3 selects the access network and commences the communication is similar to that of a flowchart of FIG. 6.

Figure 13:
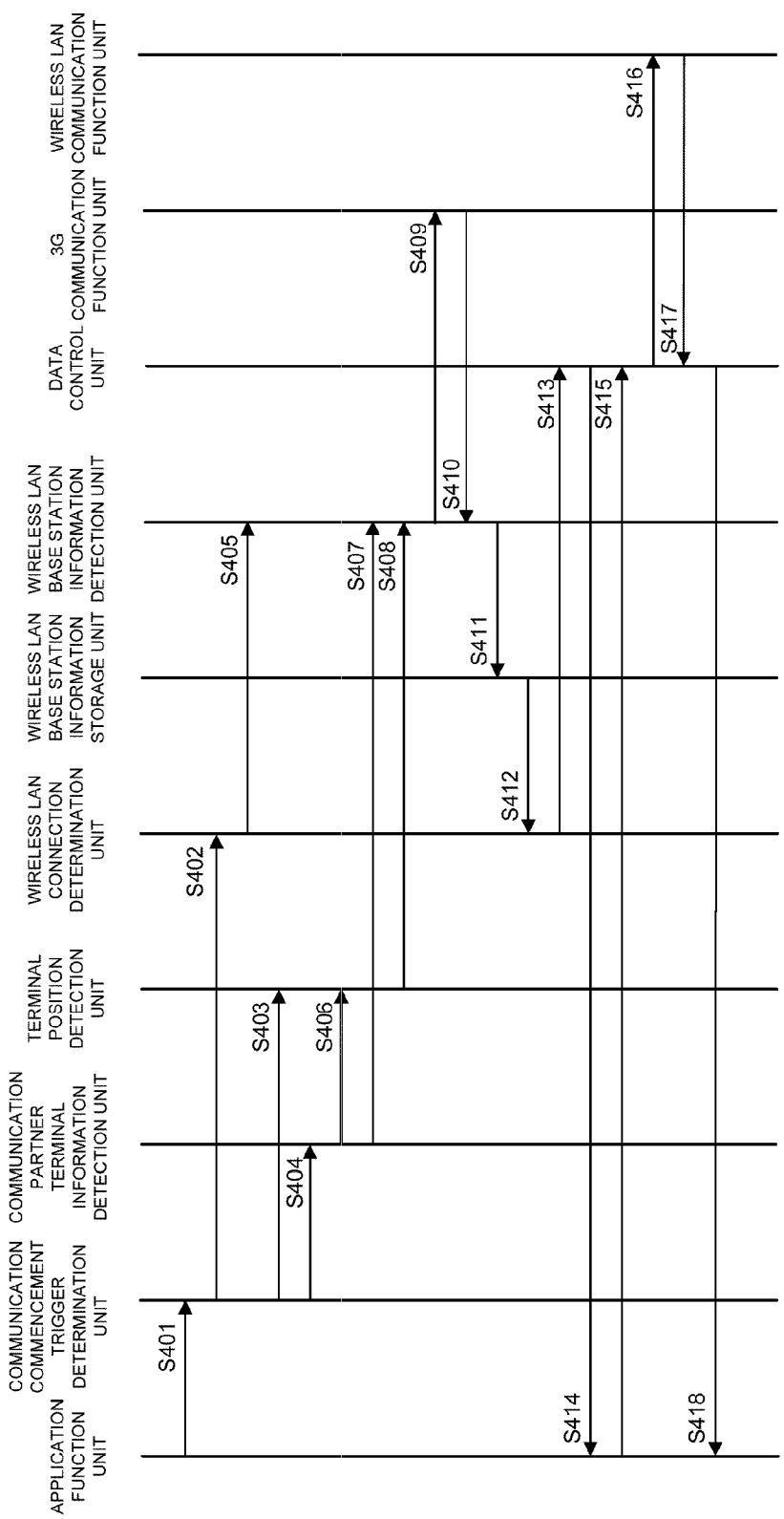
FIG. 13 is a sequence diagram illustrating an operation within the combined wireless terminal device in a third example of the present invention.

Herein, an operation inside the combined wireless terminal device 113 ranging from the trigger for commencing communication to the selection of the connection network and to the communication commencement will be explained in details. FIG. 13, which is a sequence diagram of an operation inside the combined wireless terminal device 113 ranging from the trigger for commencing communication to the selection of the connection network and to the communication commencement, illustrates the case that the wireless LAN network 103 has been selected as an access network.

A procedure (S401 to S412) ranging from a notification of a trigger for commencing the communication by the communication commencement trigger determination unit 404 to the selection of the wireless LAN connection by the wireless LAN connection determination unit 405 is similar to that of the example 1 and the example 2, so its explanation is omitted.

The wireless LAN connection determination unit 405 notifies a determination result as to whether or not to set up a connection to the wireless LAN network 103 to the data control unit 409 (S413). Herein, when having selected the wireless LAN communication, the wireless LAN connection determination unit 405 notifies the information as well of the band of which the bandwidth occupation is low, out of the bands of the wireless LAN base station device to which the combined wireless terminal device 113 and the wireless terminal device 114, being a communication partner thereof, that commence the communication revert, together with the determination result to the data control unit. In addition hereto, the data control unit 409 notifies the above band information to the application function unit 403 (S414).

Thereupon, the application function unit 403 decides the packet size etc., which is generated, from the band information of the wireless LAN base station to which both terminals commencing the communication with each other revert. For example, with the case of the voice speech, while G.711 that comparatively occupies the band is employed for the voice codec when there is a sufficient room to spare in the band of the wireless LAN base station to which both terminals revert, G.729 that does not comparatively occupy the band is employed when there is no sufficient room to spare.

And, the combined wireless terminal device 113 starts the wireless LAN transmission/reception function. A procedure of the transmission/reception and the finishing of the communication is similar to that of the example 1 and the example 2.

The invention claimed is:

1. A wireless communication system in which a wireless terminal is connectable to two wireless communication networks or more, said wireless communication system comprising:

an acquiring unit for acquiring wireless link quality associated with a wireless link quality of a base station in a predetermined wireless communication network that is a wireless local-area network (LAN) to which a wireless terminal can set up a connection and a wireless link quality information associated with a wireless link quality of a base station in a predetermined wireless communication network that is a wireless LAN to which a wireless terminal of a communication partner of said wireless terminal can set up a connection through the wireless communication network except said predetermined wireless communication network; and a determining unit for determining whether the required wireless link quality can be obtained, and determining whether said wireless terminal sets up a connection to said predetermined wireless communication network based upon said acquired wireless link quality information,
   wherein the determining unit makes a determination when starting communication and in such a manner that communication quality information of the base station of the wireless LAN to which the wireless terminal is connectable is acquire via a third-generation (3G) network,
   wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself,
   wherein the communication quality information is information regarding one of a bandwidth occupation, a packet loss, and a throughput.

2. A wireless communication system according to claim 1, wherein at least one of said predetermined communication networks is a narrow-range and high-rate communication network, and at least one is a wide-range and low-rate wireless communication network.

3. A wireless communication system according to claim 2, wherein said narrow-range and high-rate wireless communication network is a communication network having high power consumption, and wherein said wide-range and low-rate wireless communication network is a communication network having low power consumption.

4. A wireless communication system according to claim 1:
   wherein said acquiring unit acquires position information associated with a position of the base station to which said wireless terminal and said communication partner wireless terminal are connectable, and control information necessary for setting up a connection to said base station device in addition to said wireless link quality information; and
   wherein said determining unit determines whether said wireless terminal sets up a connection to said predetermined wireless communication network based upon said acquired position information, control information, and wireless link quality information.

5. A wireless communication system according to claim 1:
   wherein said wireless communication system comprises an application information acquiring unit for acquiring application information that said wireless terminal employs for communication; and
   wherein said determining unit determines whether said wireless terminal sets up a connection to said predetermined wireless communication network based upon at least each of said application information and said wireless link quality information.

6. A wireless communication system comprising:
a server comprising:
   a quality information acquiring unit for acquiring wireless link quality information associated with a wireless link quality of a base station in a predetermined wireless communication network that is a wireless local-area network (LAN); and
   a transmitter for transmitting the wireless link quality information of the base station to which a wireless terminal and a wireless terminal of a communication partner of said wireless terminal are connectable, out of the base stations in said predetermined wireless communication network, to said wireless terminal; and a wireless terminal comprising a determining receiver for receiving the wireless link quality information of the base station in said predetermined wireless communication network, and determining whether to set up a connection to said predetermined wireless communication network based upon said wireless link quality information,
   wherein the wireless terminal makes a determination when starting communication and in such a manner that communication quality information of the base station of the wireless LAN to which the wireless terminal is connectable is acquire via a third-generation (3G) network,
   wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself,
   wherein the communication quality information is information regarding one of a bandwidth occupation, a packet loss, and a throughput.

7. A wireless communication system comprising:
a server comprising:
   a quality information acquiring unit for acquiring wireless link quality information associated with a wireless link quality of a base station in a predetermined wireless communication network that is a wireless local-area network (LAN);
   a determining unit for, based upon the wireless link quality information of the base station to which a wireless terminal is connectable, out of the base stations in said predetermined wireless communication network, determining whether said wireless terminal and the wireless terminal of a communication partner of said wireless terminal set up a connection to said predetermined wireless communication network; and
   a transmitter for transmitting a determination result by said determining unit to said wireless terminal; and
a wireless terminal comprising a receiver for receiving said determination result of the connection, and setting up a connection to said predetermined wireless communication network based upon said determination result of the connection,
   wherein the determining unit makes a determination when starting communication and in such a manner that communication quality information of the base station of the wireless LAN to which the wireless terminal is connectable is acquire via a third-generation (3G) network,
   wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself,
   wherein the communication quality information is information regarding one of a bandwidth occupation, a packet loss, and a throughput.

8. A wireless communication system according to claim 7, wherein said wireless terminal acquires said wireless link quality information or said determination result of the connection via the wireless communication network except said predetermined wireless communication network.

9. A wireless communication system according to claim 7:
wherein said wireless terminal comprises a unit for acquiring position information of its own terminal, and transmitting said position information to said server; and
wherein said server comprises a unit for selecting the wireless link quality information of the base station to which said wireless terminal is connectable based upon the position information of said wireless terminal.

10. A wireless communication system according to claim 7, wherein said server comprises a unit for acquiring the position information of said wireless terminal, and selecting the wireless link quality information of the base station to which said wireless terminal is connectable based upon the position information of said wireless terminal.

11. A server for managing a wireless terminal that can set up a connection to two wireless communication networks or more, said server comprising:
an acquiring unit for acquiring wireless link quality information associated with a wireless link quality of a base station in a predetermined wireless communication network that is a wireless local-area network (LAN); and
a transmitter for transmitting the wireless link quality information of the base station to which said wireless terminal and the wireless terminal of a communication partner of said wireless terminal are connectable, out of the base stations in said predetermined wireless communication network, to said wireless terminal,
wherein a determining unit makes a determination when starting communication and in such a manner that communication quality information of the base station of the wireless LAN to which the wireless terminal is connectable is acquire via a third-generation (3G) network,
wherein the communication quality information is information regarding one of a bandwidth occupation, a packet loss, and a throughput.

12. A server for managing a wireless terminal that can set up a connect to two wireless communication networks or more, said server comprising:
an acquiring unit for acquiring wireless link quality information associated with a wireless link quality of a base station in a predetermined wireless communication network that is a wireless local-area network (LAN);
a determining unit for determining whether said wireless terminal sets up a connection to said predetermined wireless communication network based upon the wireless link quality information of the base station to which said wireless terminal and the wireless terminal of a communication partner of said wireless terminal are connectable, out of the base stations in said predetermined wireless communication network; and
a transmitter for transmitting a determination result by said determining unit to said wireless terminal,
wherein the determining unit makes a determination when starting communication and in such a manner that communication quality information of the base station of the wireless LAN to which the wireless terminal is connectable is acquire via a third-generation (3G) network,
wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself,
wherein the communication quality information is information regarding one of a bandwidth occupation, a packet loss, and a throughput.

13. A server according to claim 12, wherein said server transmits said wireless link quality information or said determination result of the connection to said wireless terminal via the wireless communication network except said predetermined wireless communication network.

14. A server according to claim 12, comprising a unit for identifying said communication partner wireless terminal from the information of said wireless terminal.

15. A wireless communication method in which a connection to two wireless communication networks or more is possible, said wireless communication method comprising:
acquiring wireless link quality information associated with a wireless link quality of a base station in a predetermined wireless communication network that is a wireless local-area network (LAN) to which a wireless terminal 1 can set up a connection and a wireless link quality information associated with a wireless link quality of a base station in a predetermined wireless communication network that is a wireless LAN to which a wireless terminal of a communication partner of said wireless terminal can set up a connection through the wireless communication network except said predetermined wireless communication network; and
determining whether the required wireless link quality can be obtained, and determining whether said wireless terminal sets up a connection to said predetermined wireless communication network based upon said acquired wireless link quality information,
wherein the determining further makes a determination when starting communication and in such a manner that communication quality information of the base station of the wireless LAN to which the wireless terminal is connectable is acquire via a third-generation (3G) network,
wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself,
wherein the communication quality information is information regarding one of a bandwidth occupation, a packet loss, and a throughput.

16. A non-transitory recording medium in which a program of a server for managing a wireless terminal that can set up a connection to two wireless communication networks or more is stored, said program causing the server to execute the processes of:
acquiring wireless link quality information associated with a wireless link quality of a base station in a predetermined wireless communication network that is a wireless local-area network (LAN); and
transmitting the wireless link quality information of the base station to which said wireless terminal and the wireless terminal of a communication partner of said wireless terminal are connectable, out of the base stations in said predetermined wireless communication network, to said wireless terminal,
wherein a determination is made when starting communication and in such a manner that communication quality information of the base station of the wireless LAN to which the wireless terminal is connectable is acquire via a third-generation (3G) network, wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself 17. A non-transitory recording medium in which a program of a server for managing a wireless terminal that can set up a connection to two wireless communication networks or more is stored, said program causing the server to execute the processes of:

acquiring wireless link quality information associated with a wireless link quality of a base station in a predetermined wireless communication network that is a wireless local-area network (LAN);

determining whether said wireless terminal sets up a connection to said predetermined wireless communication network based upon the wireless link quality information of the base station to which said wireless terminal and the wireless terminal of a communication partner of said wireless terminal are connectable, out of the base stations in said predetermined wireless communication network; and transmitting said determination result to said wireless terminal, wherein the determining further makes a determination when starting communication and in such a manner that communication quality information of the base station of the wireless LAN to which the wireless terminal is connectable is acquire via a third-generation (3G) network, wherein the base station in the wireless LAN is within a 3G cell in which the wireless terminal is located, as identified by comparing position information of each of the wireless terminal and the wireless terminal of the communication partner with information regarding the base station acquired from the base station itself as stored within the base station itself, wherein the communication quality information is information regarding one of a bandwidth occupation, a packet loss, and a throughput.

18. A non-transitory recording medium in which a program of a server according to claim 17, wherein said acquiring process is a process of acquiring the wireless link quality information associated with the wireless link quality of the base station in said predetermined wireless communication network via the wireless communication network except said predetermined wireless communication network.

19. A wireless communication system according to claim 8, wherein said wireless terminal acquires said wireless link quality information or said determination result of the connection via the wireless communication network except said predetermined wireless communication network.

20. A wireless communication system according to claim 8:

wherein said wireless terminal comprises a unit for acquiring position information of its own terminal, and transmitting said position information to said server; and wherein said server comprises a unit for selecting the wireless link quality information of the base station to which said wireless terminal is connectable based upon the position information of said wireless terminal.

21. A wireless communication system according to claim 8, wherein said server comprises a unit for acquiring the position information of said wireless terminal, and selecting the wireless link quality information of the base station to which said wireless terminal is connectable based upon the position information of said wireless terminal.

22. A wireless communication system according to claim 9, wherein said server transmits said wireless link quality information or said determination result of the connection to said wireless terminal via the wireless communication network except said predetermined wireless communication network.

23. A wireless communication system according to claim 9, comprising a unit for identifying said communication partner wireless terminal from the information of said wireless terminal.

24. A non-transitory recording medium in which a program of a server according to claim 18, wherein said acquiring process is a process of acquiring the wireless link quality information associated with the wireless link quality of the base station in said predetermined wireless communication network via the wireless communication network except said predetermined wireless communication network.

* * * * *